United States Patent [19]

Nishi et al.

[11] Patent Number: 5,724,126
[45] Date of Patent: Mar. 3, 1998

[54] METHOD FOR MEASURING DISTRIBUTION OF ZERO DISPERSION WAVELENGTHS IN AN OPTICAL FIBER AND APPARATUS THEREFOR

[75] Inventors: Shigendo Nishi, Yokosuka; Katsumi Iwatsuki; Ken-ichi Suzuki, both of Yokohama; Masatoshi Saruwatari, Yokosuka, all of Japan

[73] Assignee: Nippon Telegraph and Telephone Corporation, Tokyo, Japan

[21] Appl. No.: 435,640

[22] Filed: May 5, 1995

[30] Foreign Application Priority Data

May 6, 1994 [JP] Japan ................... 6-094239

[51] Int. Cl.⁶ .................... G01N 21/41; G01N 21/84
[52] U.S. Cl. .................................... 356/73.1
[58] Field of Search ............................ 356/73.1

[56] References Cited

U.S. PATENT DOCUMENTS

| 4,633,524 | 12/1986 | Hasegawa | 356/73.1 |
| 5,179,420 | 1/1993 | So et al. | 356/73.1 |

FOREIGN PATENT DOCUMENTS

| 63-309833 | 12/1988 | Japan . |
| 2-281122 | 11/1990 | Japan . |
| 2281122 | 11/1990 | Japan . |

OTHER PUBLICATIONS

Nishi et al "Technique for measuring . . . modulation Instability" Electronics Letters vol. 31 No. 3, pp. 225–226, Feb. 2, 1995.

C. Lin et al., "Chromatic Dispersion Measurements in Single–Mode Fibers Using Picosecond in GaAsP Injection Lasers . . . ", *The Bell System Technical Journal*, Feb. 1983, vol. 62, No. 2, pp. 457–462.

P.J. Vella et al., "Measurement Of Chromatic Dispersion Of Long Spans Of Single–Mode Fibre: A Factory And Field Test Method", *Electronics Letters*, Feb. 16, 1984, vol. 20, No. 4, pp. 167–168.

Bruno Costa et al., "Phase Shift Technique for the Measurement of Chromatic Dispersion in Optical Fibers Using LED'S", *IEEE Journal of Quantum Electronics*, vol. QE–18, No. 10, Oct. 1982, pp. 1509–1515.

M. Ohashi et al., "Novel Technique For Measuring Longitudinal Chromatic Dispersion Distribution In Singlemode Fibres", *Electronics Letters*, Mar. 4, 1993, vol. 29, No. 5, pp. 426–428.

M. Stern et al., "Soliton Technique to Characterize Single–Mode Fiber Dispersion", *Journal of Lightwave Technology*, Dec. 1992, vol. 10, No. 12, pp. 1777–1780.

Clemens Unger et al., "Determination Of The Inhomogeneity Of A Single–Mode Fiber Along Its Length By . . . ", *Technical Digest Symp.*, 1994, pp. 65–68.

*Primary Examiner*—Vincent P. McGraw
*Attorney, Agent, or Firm*—Spencer & Frank

[57] ABSTRACT

In the method of measuring a distribution of zero dispersion wavelengths in an optical fiber in a longitudinal direction, an optical pulse and a pump light are launched into the optical fiber. A gain generation portion of the optical fiber which indicates that the optical pulse power is amplified based on modulation instability induced by the pump light is detected from a back-scattered light waveform of the optical pulse indicative of an optical pulse power distribution in the longitudinal direction of the optical fiber. A zero dispersion wavelength of the gain generation portion of the optical fiber is determined from the pump light wavelength.

31 Claims, 22 Drawing Sheets

METHOD FOR MEASURING DISTRIBUTION OF ZERO DISPERSION WAVELENGTHS IN AN OPTICAL FIBER AND APPARATUS THEREFOR

BACKGROUND OF THE INVENTION

1. Field of the Invention

The present invention relates to a method for measuring the distribution of zero dispersion wavelengths in an optical fiber, and more particularly, to a method and apparatus for measuring the distribution of zero dispersion wavelengths of an optical fiber in a longitudinal direction.

2. Description of the Prior Art

Various methods for measuring a dispersion value of an optical fiber are proposed in, for example, U.S. Pat. No. 4,752,125; C. Lin, et al., (Bell syst. Tech. J., 1983, 62, pp. 475–462); P. J. Vella, et al., (Electron. Lett. 1984, 20, pp. 167–168); B. Costa, et al., (IEEE J. Quantum Electron., 1982, QE-18, pp. 1509–1515); Japanese Patent Application Laying-open No. 63-309833; and M. Stern, et al., (IEEE J. Lightwave Technol., 1992, 10, pp. 1777–1780). In the methods disclosed in the U.S. Pat. No. 4,752,125 and proposed by C. Lin et al., the amount of a group-velocity delay time difference is measured from a flight time difference between two types of optical pulses having different wavelengths after the two types of optical pulses have propagated in an optical fiber and then the total amount of dispersion between both ends of the fiber is determined from the amount of the group-velocity delay time and the wavelength difference. In the methods proposed by P. J. Vella, et al. and B. Costa, et al., the amount of a group-velocity delay time difference is measured from the phase difference between two types of sinusoidally modulated signal light having different wavelengths after they have propagated in an optical fiber and then the total amount of dispersion between both ends of the fiber is measured from the amount of the group-velocity delay time difference and the wavelength difference. In the methods disclosed in Japanese Patent Application Laying-open No. 309833/1988 and proposed by M. Stern, a high power intensity light having a wavelength equal to the zero dispersion wavelength is converted into a light having a different wavelength due to a non-linear effect through propagating in a fiber, and by observing the spectrum of the propagated light a wavelength at which excess loss is observed is determined to be a zero dispersion wavelength. In these methods, an average zero dispersion wavelength is measured.

However, in all of the above-mentioned methods, in order to measure the distribution of zero dispersion wavelengths in an optical fiber, the optical fiber must be cut out into pieces and the zero dispersion wavelength must be measured on each of the pieces.

As an example of the above-mentioned conventional technique, FIG. 1 shows a measuring apparatus in which two optical pulses having different wavelengths are launched into an optical fiber under testing. The difference between the two optical pulses in the group-velocity delay time is measured at the output end of the optical fiber under testing and a total dispersion value is determined based on the measured difference. In FIG. 1, the measuring apparatus is composed of a pulse generator 1, light source drivers $2a$ and $2b$, a light source 3 driven by the light source driver $2a$ and emitting light having a wavelength of $\lambda_1$, a light source 4 driven by the light source driver $2b$ and emitting light having a wavelength of $\lambda_2$, a multiplexer 5 for multiplexing the optical pulses emitted from the light sources 3 and 4 to input to the optical fiber under testing 6, a high-speed detector 7 for detecting output light from the optical fiber under testing 6, and a sampling oscilloscope 8 for observing the output of the high-speed detector 7.

In this arrangement, two optical pulses respectively having wavelengths $\lambda_1$ and $\lambda_2$ are launched into the optical fiber under testing 6. The optical pulses are detected at the output terminal of the optical fiber under testing 6 by the high-speed detector 7 and the flight time difference $\Delta\tau$ between the two optical pulses in group-velocity delay time is observed by the sampling oscilloscope 8. An average value $D_{ave}$ of the chromatic dispersion values in a longitudinal direction of optical fiber under testing 6 is determined from the following equation (1)

$$D_{ave}=\Delta\tau/\{(\lambda_1-\lambda_2)L\} \tag{1}$$

where L is a length of the optical fiber under testing 6. As seen from the above description, what is determined by the measuring apparatus is the average dispersion value, i.e., a dispersion value per a unit length of the test optical fiber under testing 6 determined from a total amount of dispersion values between both ends of the optical fiber under testing 6.

As the signal transmission rate is increased, specifically in the case of, for example, an optical soliton transmission, a knowledge of local dispersion values of an optical fiber is necessary for design of the optical transmission line. In this case, dispersion is the total dispersion as a sum of waveguide dispersion and material dispersion. Note that it is not necessary to consider mode dispersion because a single mode fiber is used in high speed transmission.

Methods for measuring a distribution of dispersion values in an optical fiber have been proposed by M. Ohashi et al., (Electron. Lett. 1993, 29, pp. 426–428) and C. Unger at al., (Tech. Digest Symp. on Optical Fiber Measurement Boulder 1994, pp. 65–68). In these methods, the distribution of mode field diameters is estimated from optical time domain reflectometer (OTDR) waveforms measured from both ends of the optical fiber under testing and the distribution of waveguide dispersion values is estimated from the distribution of mode field diameters. In these methods, however, there is a relatively large error because the dispersion values are indirectly estimated through the mode field diameters. Further, the distribution estimated is not the total dispersion value but only the waveguide dispersion value. Additionally, there is the problem in that access to both the ends of the optical fiber under testing is necessary.

In Japanese Patent Application Laying-open No. 281122/1990, the technique for determining a distribution of dispersion values in an optical fiber is disclosed. In this technique the relative delay time between a probe pulse with a wavelength $\lambda pr$ and a pump pulse with a wavelength $\lambda pu$ is converted to Raman gain due to the saw-tooth waveform of the pump pulse, and the gain of the induced Raman amplification that the probe pulse experience at a portion where the probe pulse and the pump pulse overlap is measured by the OTDR technique to determine the distribution of dispersion values in the optical fiber. However, this technique is not practical because it is difficult to generate saw-tooth-shaped pump light pulses with high output power.

A technique may be considered in which distribution information is obtained by measuring at a receiving end of an optical fiber the probe light subjected to orthogonal polarization by a pump light pulse. In this method the wavelength of the probe light is modulated and the wavelength modulation is converted into amplitude modulation due to dispersion of an optical fiber and the amplitude is increased as the total amount of dispersion from the input to the switching point becomes large. Accordingly, there is a problem in that accesses to both ends of the optical fiber is required.

Therefore, in any of the conventional methods, it is impossible or very difficult to determine the distribution of dispersion values in a longitudinal direction of an optical fiber or the distribution of zero dispersion wavelengths.

SUMMARY OF THE INVENTION

An object of the present invention is to provide the method of measuring a distribution of zero dispersion wavelengths in a longitudinal direction of an optical fiber under testing.

Another object of the present invention is to provide an apparatus for the above method.

In a first aspect of the present invention, there is provided the method for measuring a distribution of zero dispersion wavelengths in an optical fiber, comprising the steps of:

being launched optical pulse or optical pulse and pump light into an optical fiber under testing;

observing a back-scattering light waveform of the optical pulse, the waveform being indicative of a distribution of a power of the optical pulse in the optical fiber under testing in a longitudinal direction;

measuring from the observed back-scattering light waveform a portion where modulation instability is induced in the optical fiber under testing; and determining a zero dispersion wavelength at a portion of the optical fiber under testing where the modulation instability generates from a wavelength of the optical pulse or pump light.

A probe optical pulse and a pump light may be launched into the optical fiber under testing as the optical pulse or optical pulse and pump light, and wherein a gain generation portion of the optical fiber under testing where a power of the probe optical pulse is amplified due to the modulation instability induced by the pump light, may be detected from the back-scattering light waveform of the probe optical pulse indicative of the distribution of the power of the probe optical pulse in the optical fiber under testing in the longitudinal direction, and wherein the zero dispersion wavelength of the gain generation portion of the optical fiber under testing is determined based on the pump light wavelength.

A method may further comprise the step of sweeping the pump light wavelength, each of the wavelengths at which amplification of the probe optical pulse power is detected in portions of the optical fiber under testing is determined as the zero dispersion wavelength of each of the portions.

A light obtained by polarization-multiplexing two types of light which have polarization planes orthogonal to each other and have an identical wavelength intensity may be used as the pump light.

A light obtained by polarization-multiplexing two kinds of light which have polarization planes orthogonal to each other and have an identical wavelength and intensity may be used as the probe optical pulse.

An average gain generation portion of the optical fiber under testing may be detected by randomly changing the polarization state of at least one of the pump light and the probe optical pulse and by averaging a plurality of the back-scattering light waveforms repetitively obtained in a state in which the polarization state of the pump light or the probe pulse at input end of the optical fiber under testing on measuring the plurality of the back-scattering light waveforms are different from each other.

A method may further comprise the steps of making the pump light to be a sequence of pulses; and amplifying the sequence of pulses by an optical fiber amplifier which directly amplifies light using rare earth doped optical fiber, and wherein a duration time of each of pulses of the pump light may be shorter than that of the prove optical pulse and repetition frequency of pulses of the pump light may be such that there are a plurality of pulses of the pump light in the pulse duration time of the probe optical pulse.

The sequence of pulses of the pump light may be converted into a sequence of pulse bursts of the pump light and the sequence of pulse bursts of the pump light and the probe optical pulse are launched into the optical fiber under testing in synchronously.

A probe optical pulse and a pump light may be launched into the optical fiber under testing as the optical pulse or optical pulse and pump light, and by detecting a back-scattering light waveform of a wavelength converted light pulse which has a wavelength substantially symmetric to the probe optical pulse wavelength with respect to the pump light wavelength as a symmetric axis on a wavelength spectrum, a portion of the optical fiber under testing where the wavelength converted light pulse generates due to the modulation instability induced by the pump light may be detected, and wherein the zero dispersion wavelength of the portion of the optical fiber under testing where wavelength converted light pulse generates may be determined based on the pump light wavelength.

A method may further comprise the step of sweeping the pump light wavelength, each of the wavelengths at which the generation of the wavelength converted light pulse is detected in portions of the optical fiber under testing is determined as the zero dispersion wavelength of each of the portions.

A light obtained by polarization-multiplexing two types of light which have polarization planes orthogonal to each other and have an identical wavelength and intensity may be used as the pump light.

A light obtained by polarization-multiplexing two kinds of light which have polarization planes orthogonal to each other and have an identical wavelength and intensity may be used as the probe optical pulse.

A portion of the optical fiber under testing, where the wavelength converted light pulse generates on an average, may be detected by randomly changing the polarization state of at least one of the pump light and the probe optical pulse and by averaging a plurality of the back-scattering light waveforms repetitively obtained in a state in which the polarization state of the pump light or the probe pulse at input end of the optical fiber under testing on measuring the plurality of the back-scattering light waveforms are different from each other.

A method may further comprise the steps of making the pump light to be a sequence of pulses; and amplifying the sequence of pulses by an optical fiber amplifier which directly amplifies light using an rare earth doped optical fiber, and wherein a duration time of each of pulses of the pump light may be shorter than that of the probe optical pulse and repetition frequency of pulses of the pump light is such that there are a plurality of pulses of the pump light in the pulse duration time of the probe optical pulse.

The sequence of pulses of the pump light may be converted into a sequence of pulse bursts of the pump light and the sequence of pulse bursts of the pump light and the probe optical pulse are launched into the optical fiber under testing synchronously.

A kind of optical pulse may be launched into the optical fiber under testing as the optical pulse or optical pulse and pump light, by observing a back-scattering light waveform of the optical pulse which indicates a power distribution of the optical pulse in the optical fiber under testing in a longitudinal direction, a excess-loss generation portion of the optical fiber under testing where the optical pulse power is excessively attenuated due to the modulation instability induced by the optical pulse may be detected, and wherein the zero dispersion wavelength of the excess-loss generation portion of the optical fiber under testing may be determined based on the optical pulse wavelength.

A method may further comprise the step of sweeping optical pulse wavelength, each of the wavelengths in which the excess-attenuation of the optical pulse power is detected in portions of the optical fiber under testing is determined as the zero dispersion wavelength of each of the portions.

In a second aspect of the present invention, there is provided a measuring apparatus for measuring a distribution of zero dispersion wavelengths of an optical fiber under testing, comprising:

pulse light source means for generating an optical pulse;

receiving means for receiving a back-scattering light of the optical pulse which generates in optical fiber under testing; and detecting means for generating a back-scattering light waveform indicative of a power distribution of the optical pulse in the optical fiber under testing in a longitudinal direction, and for detecting a portion of the optical fiber under testing where a modulation instability generates from the back-scattering light waveform.

The detecting means may detect a excess-loss generation portion of the optical fiber under testing.

The measuring apparatus may further comprise pump light source means for generating a pump light and a multiplexer for multiplexing the pump light and the optical pulse and launching multiplexed the pump light and the optical pulse into the optical fiber under testing, and wherein the detecting means detects a gain generation portion of the optical fiber under testing.

The pump light source means may include two pump light sources for generating two kinds of light having polarization planes orthogonal to each other and having a same wavelength and same intensity, and wherein the measuring apparatus may further comprises a polarization multiplexer for polarization multiplexing the two kinds of light.

The pulse light source means may include two pulse light sources for generating two kinds of light pulses having polarization planes orthogonal to each other and having a same wavelength and same intensity, and wherein the measuring apparatus may further comprises a polarization multiplexer for polarization multiplexing the two kinds of light pulses.

A measuring apparatus may further comprise at least one of means for changing a polarization state of the pump light and means for changing a polarization state of the optical pulse.

A measuring apparatus may further comprise means for making the pump light to be a sequence of pulses; and an optical fiber amplifier for amplifying the pulse sequence of the pump light.

A measuring apparatus may further comprise means for making the pulse sequence of the pump light to be sequence of pulse bursts; and means for synchronizing the sequence of pulse bursts of the pump light with the optical pulses to launch synchronized the sequence of pulse bursts of the pump light and the optical pulses into the optical fiber under testing.

A measuring apparatus may further comprise pump light source means for generating the pump light and a multiplexer for multiplexing the pump light and the optical pulse to launch multiplexed the pump light and the optical pulse into the optical fiber under testing, and wherein the receiving means for receiving the back-scattering light of a wavelength converted light pulse having a wavelength substantially symmetric to a wavelength of the optical pulse with respect to a wavelength of the pump light as a symmetric axis on a wavelength spectrum, and wherein the detecting means may detect a portion of the optical fiber under testing where a wavelength converted light pulse generates.

The pump light source means may include two pump light sources for generating two kinds of light having polarization planes orthogonal to each other and having a same wavelength and same intensity, and wherein the measuring apparatus may further comprises a polarization multiplexer for polarization multiplexing the two kinds of light.

The pulse light source means may include two pulse light sources for generating two kinds of light pulses having polarization planes orthogonal to each other and having a same wavelength and same intensity, and wherein the measuring apparatus may further comprises a polarization multiplexer for polarization multiplexing the two kinds of light pulses.

A measuring apparatus may further comprise at least one of means for changing a polarization state of the pump light and means for changing a polarization state of the optical pulse.

A measuring apparatus may further comprise means for making the pump light to be a sequence of pulses; and an optical fiber amplifier for amplifying the pulse sequence of the pump light.

A measuring apparatus may further comprise means for making the pulse sequence of the pump light to be sequence of pulse bursts; and means for synchronizing the sequence of pulse bursts of the pump light with the optical pulses to launch synchronized the sequence of pulse bursts of the pump light and the optical pulses into the optical fiber under testing.

In the present invention, in order to measure the distribution of zero dispersion wavelengths of an optical fiber under testing, the invention utilizes, the fact that modulation instability caused by a pump light occurs in only an anomalous dispersion region (at the longer wavelength side of a zero dispersion wavelength in an ordinary optical fiber and the following embodiments are based on this fact). That is, if the wavelength of the pump light to the optical fiber under testing slightly exceeds the zero dispersion wavelength of each of the portions of the optical fiber under testing, modulation instability is induced by the incident light in each portion of the optical fiber under testing. By observing the included modulation instability phenomenon over the whole length of the optical fiber under testing, the zero dispersion wavelength of the portion where the modulation instability is induced can be determined from the wavelength of pump light. That is, whether the zero dispersion wavelength at each portion of the optical fiber under testing is larger than the pump light wavelength or not is known from the presence or absence of modulation instability.

The following phenomena are induced by the modulation instability.

(1) When the optical pulse and the pump light are launched into the optical fiber under testing, the power of the optical pulse is amplified in accordance with the wavelength of the pump light.

(2) When the optical pulse and the pump light are launched into the optical fiber under testing, there is produced a wavelength converted optical pulse, and the wavelength difference between the wavelength converted optical pulse and the pump light is substantially the same in the absolute value and inverse in the sign as that between the pump light and the optical pulse.

In other words, the wavelength of the wavelength of converted optical pulse is symmetrical to the wavelength the optical pulse with respect to the wavelength of the pump light.

(3) When the optical pulse is launched into the optical fiber under testing, the power of the optical pulse is converted into the power of another optical pulse having a wavelength different from the wavelength of the optical pulse so that the original optical pulse is attenuated.

In the present invention, one of these modulation instability phenomena is utilized. That is, a portion of the optical fiber under testing where gain is generated can be detected from the back-scattering light waveform of the optical pulse. In this case, the zero dispersion wavelength at the gain generation portion of the optical fiber under testing is estimated to be slightly shorter than the pump light wavelength. Note that the zero dispersion wavelength at any portion other than the gain generation-portion is estimated to be very much longer or very much shorter than the pump light wavelength.

Moreover, when the pump light wavelength is swept, it can be detected based on the generation of gain that the pump light wavelength is swept from a wavelength in the normal dispersion region to a wavelength of the anomalous dispersion region through the zero dispersion wavelength in each of portions of the optical fiber under testing. That is, the pump light wavelength at the time when any gain is generated can be determined as the zero dispersion wavelength in a portion of the optical fiber under testing where gain occurs.

When the optical pulse and the pump light are launched into the optical fiber under testing, by utilizing the phenomenon that a wavelength converted optical pulse is generated in only the portion where the modulation instability occurs due to the pump light, a portion of the optical fiber under testing where the modulation instability occurs can be detected from the backscattering light waveform of the wavelength converted optical pulse. In this case, the zero dispersion wavelength of the portion of the optical fiber under testing where the wavelength conversion occurred is estimated to be slightly shorter than the pump light wavelength. Note that the zero dispersion wavelength in any portion where a wavelength converted optical pulse is not generated is very much longer or very much shorter than the pump light wavelength.

Moreover, when the pump light wavelength is swept, it can be detected based on the wavelength converted optical pulse that the pump light wavelength is swept from a wavelength in the normal dispersion region to a wavelength of the anomalous dispersion region through the zero dispersion wavelength in each of the portions of the optical fiber under testing. That is, the pump light wavelength at the time when the wavelength converted optical pulse is generated can be determined as the zero dispersion wavelength in the wavelength converted optical pulse generation portion of the optical fiber under testing where wavelength conversion occurs.

Further, an excess-loss occurring portion of the optical fiber under testing can be detected from the back-scattering light waveform of the optical pump pulse itself. In this case, the zero dispersion wavelength at the excess-loss occurring portion of the optical fiber under testing is estimated to be slightly shorter than the pump pulse wavelength. Note that the zero dispersion wavelength at any portion other than the excess-loss occurring portion is estimated to be very much longer or very much shorter than the pump pulse wavelength.

Moreover, when the pump pulse wavelength is swept, it can be detected based on the excess-loss occurrence that the pump pulse wavelength is swept from a wavelength in the normal dispersion region to a wavelength of the anomalous dispersion region through the zero dispersion wavelength in each of portions of the optical fiber under testing. That is, the pump pulse wavelength at the time when any loss occurs can be determined as the zero dispersion wavelength in a portion of the optical fiber under testing where the excess-loss occurs.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

In the measurement of distribution of zero dispersion wavelengths in an optical fiber, whether there is modulation instability which occurs in only an anomalous dispersion region (in an ordinary optical fiber, this is on the side of longer wavelengths than a zero dispersion wavelength of the fiber and the following description is based on this premise) or not is detected from a back-scattering light waveform observed by an optical time domain reflectometer (OTDR). That is, by observing the above-mentioned phenomena indicated as (1), (2) and (3) (see the "Summary of the Invention" section) and induced by the modulation instability over the whole length of the optical fiber under testing, a zero dispersion wavelength of the portion where any of the phenomena appears can be determined from the wavelengths of the pump light or OTDR pulse. Also, the wavelength of the pump light or OTDR pulse launched into the optical fiber under testing is gradually swept from a shorter wavelength side to a longer wavelength side and the zero dispersion wavelengths distributed in the optical fiber under testing are determined one by one based on the modulation instability phenomena which appear sequentially from a portion having a shorter zero dispersion wavelength.

First, an embodiment will be described below in which the distribution of zero dispersion wavelengths in the optical fiber under testing is determined from the observation of the first one of the above-mentioned modulation instability phenomena.

Figure 1:
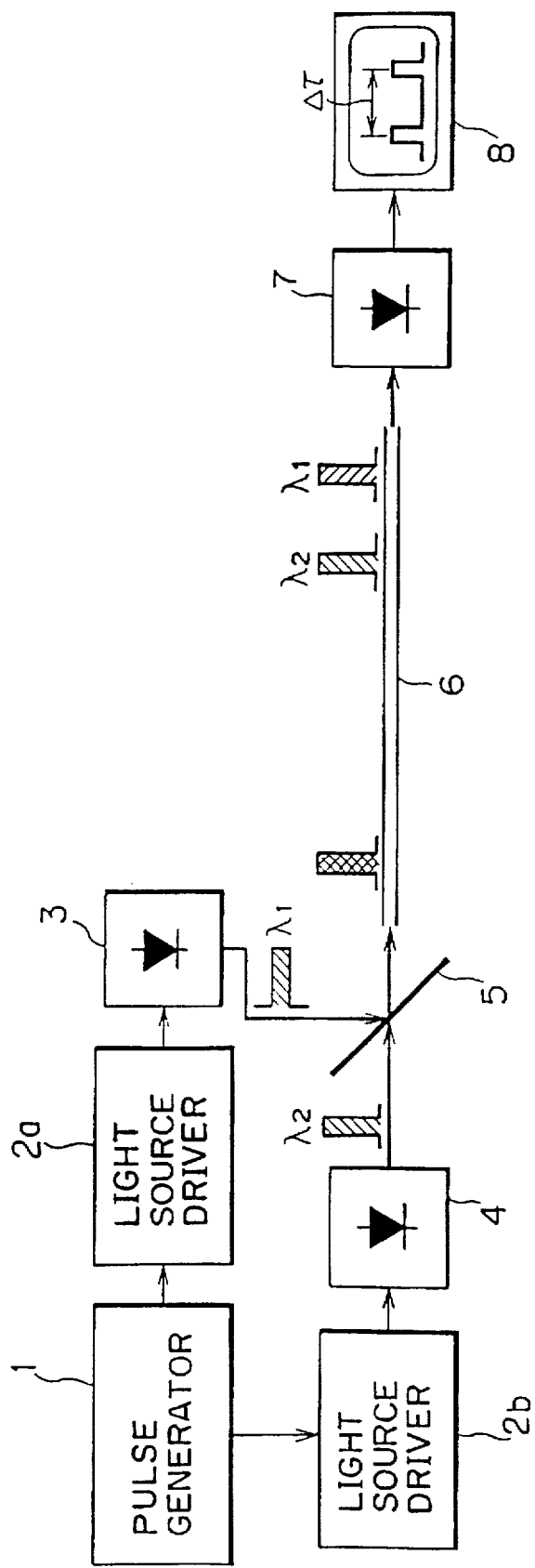
FIG. 1 is a block diagram showing a conventional measuring apparatus for measuring an optical fiber dispersion value.
Figure 2:
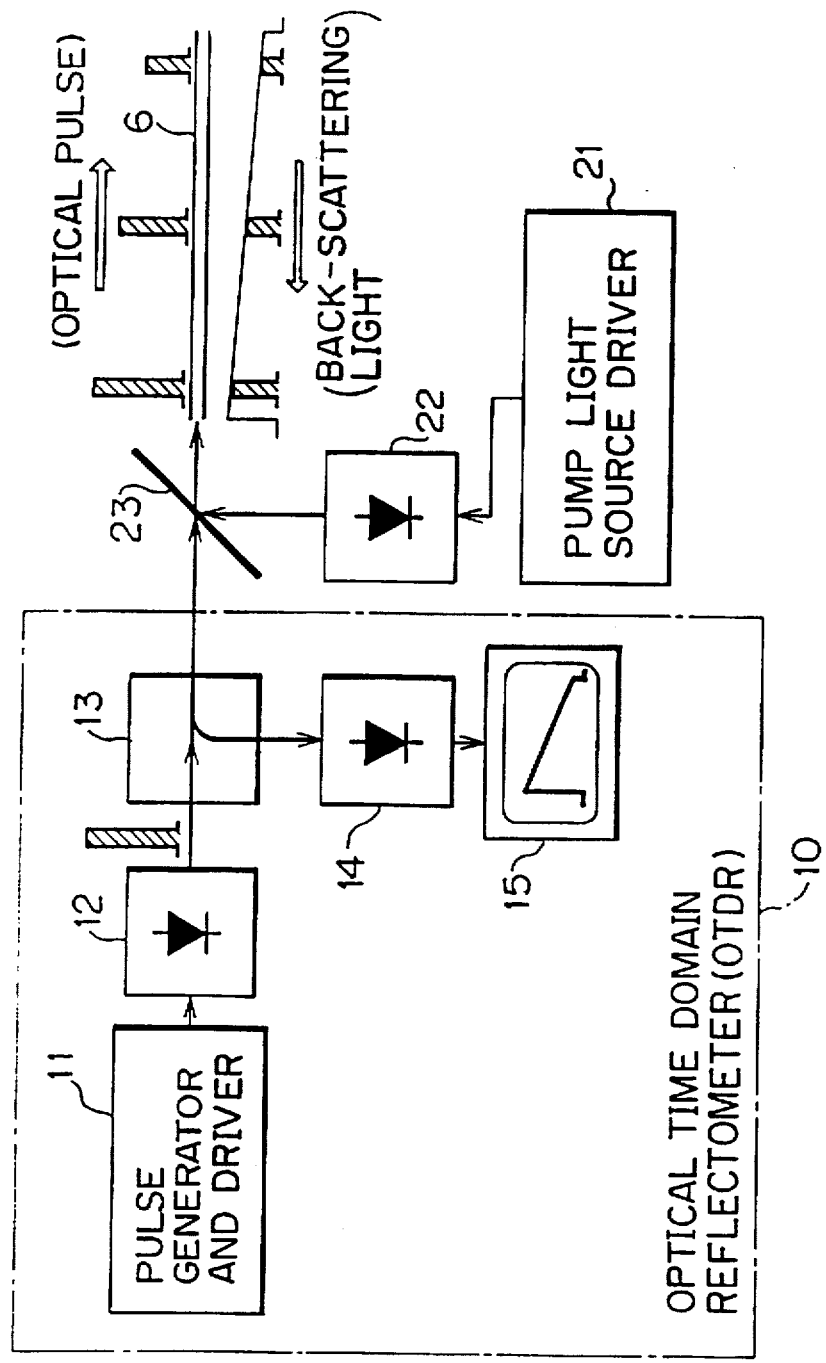
FIG. 2 is a block diagram showing the basic construction of an embodiment of an apparatus for measuring the distribution of zero dispersion wavelengths of an optical fiber according to the present invention.

FIG. 2 is a block diagram showing the first basic construction of an apparatus for measuring the distribution of zero dispersion wavelengths in the optical fiber. In FIG. 2, an optical time domain reflectometer (OTDR) 10 is composed of a pulse generating and driving section 11, a directional coupler 13, a high speed light detector 14, and a back-scattering light waveform display section 15. Reference numeral 21 denotes a pump light source driving section, reference numeral 22 is a wavelength tunable pump light source, and reference numeral 23 is a multiplexer for multiplexing a probe optical pulse (to be referred to as "an OTDR pulse" hereinafter) coming out of the optical time domain reflectometer 10 and pump light coming out of the pump light source 22 such that the multiplexed light is launched into an optical fiber under testing 6 to be measured.

The optical time domain reflectometer 10 outputs the OTDR pulse to the optical fiber under testing 6. In propagation of the OTDR pulse, back-scattering light of occurs at any portion of the optical fiber under testing 6. In the optical time domain reflectometer 10 the back-scattered light (hereinafter frequently called "back-scattered light" which is generated at any of the portions of the optical fiber under testing 6 and returned from the portions is branched by the directional coupler 13 and detected by the high speed light detector 14, and the waveform of the detected back-scattering light is displayed on the back-scattering light waveform display section 15. Here, the power of the back-scattering light is proportional to that of the OTDR pulse at a position where the back-scattering light was generated. The OTDR pulse is attenuated due to a loss in the optical fiber before it reaches the respective portions and the back-scattering light is also attenuated with the same rate of loss before it returns to the input terminal of the optical fiber under testing. Moreover, the back-scattering light is continuously returned from the various portions during the propagation of the OTDR pulse and, therefore, the time required until the back-scattering light is generated at the most distant portion and returns to the input terminal becomes longer. Therefore, the back-scattering light has a remarkably spread waveform, compared to that of the OTDR pulse launched into the optical fiber under testing 6. Consequently, by observing the waveform of the back-scattering light, the distribution of yhe OTDR pulse power in the optical fiber under testing 6 in the longitudinal direction can be determined. Also, the inclination of change of the OTDR pulse power with respect to the distance represents the loss of the optical fiber under testing 6.

Figure 3:
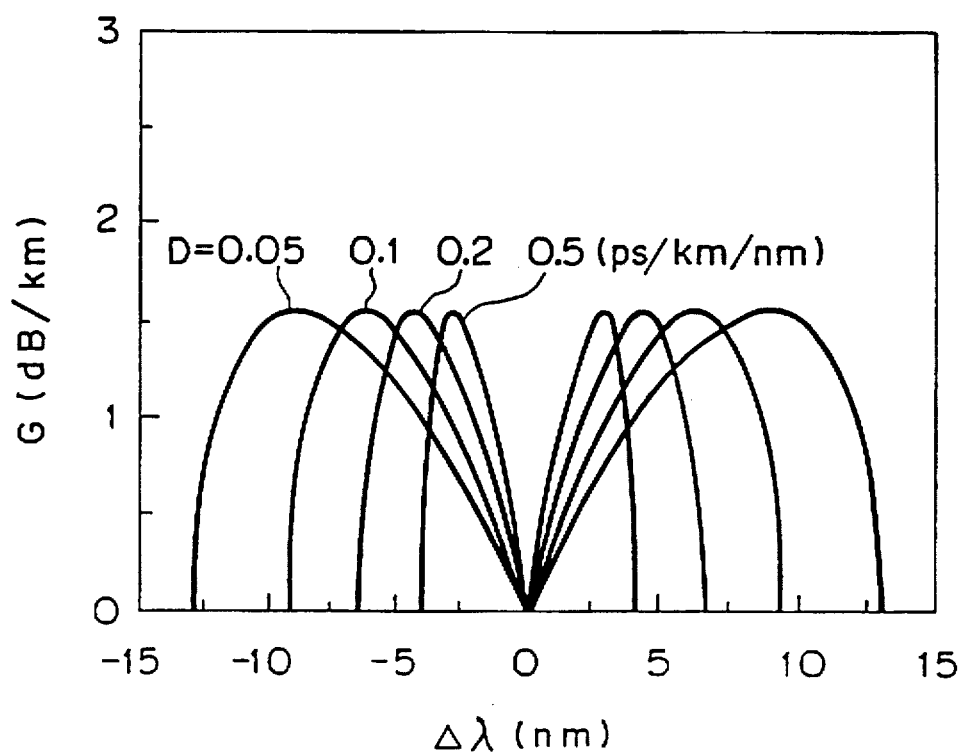
FIG. 3 is a graph showing a wavelength characteristic of gain G per unit length of the optical fiber.

Next, the measurement principle of the distribution of zero dispersion wavelengths in the foregoing apparatus will be described below. Modulation instability is one of the non-linear phenomena appearing in an optical fiber and corresponds to four wave mixing in the case that phase matching caused by self phase modulation occurs. The modulation instability is a phenomenon in which when light having a high intensity is launched into the optical fiber under testing, a gain occurs at both side band wavelengths of the high intensity light. The gain G (dB) per unit length of the optical fiber under testing is expressed by the following equation (2), $$G = 4.343 \frac{|D| \cdot \Delta\lambda}{2\pi \cdot \lambda_{pu}} \left\{ \frac{8\pi \cdot n_2 \cdot c \cdot P_0}{\lambda_{pu} \cdot A_{\mathit{eff}} \cdot |D|} - \left[\frac{c}{\lambda_{pu}}\right]^2 \cdot (\Delta\lambda)^2 \right\}^{1/2} \quad (2)$$

where D is a dispersion value at the wavelength of the pump light, $n_2$ is a non-linear refractive index coefficient, $A_{\mathit{eff}}$ is the effective core area, c is the velocity of the light in vacuum, $P_0$ is the power of pump light, $\lambda pu$ is the pump light wavelength, and $\Delta\lambda$ is an amount of wavelength shift from the pump light wavelength. FIG. 3 shows the wavelength characteristic of the gain G calculated from equation (2) when the dispersion D takes the values 0.05, 0.1, 0.2, and 0.5 (ps/km/nm). Note that it is assumed that $\lambda pu=1550$ (nm), $P_0=100$ (mW), $A_{\mathit{eff}}=50$ ($\mu m^2$), and $n_2=3.2\times10^{-16}$ ($cm^2/W$).

For example, it is assumed that the loss at a portion of the optical fiber first diminishes when the wavelength $\lambda_{pu}$ of the pump light is gradually changed toward a longer wavelength direction and set to $\lambda_0$ while the loss of the optical fiber under testing 6 is monitored by the optical time domain reflectometer 10. That is, it is assumed that a local gain is generated at the portion. In this case, it can be estimated that a zero dispersion wavelength at that portion is $\lambda 0$. Moreover, if the loss diminishes at a different portion of the optical fiber under testing when the pump light wavelength is further changed toward the longer wavelength direction and set to $\lambda_1$, it can be also estimated that the zero dispersion wavelength of the different portion is $\lambda_1$. In this manner, the zero dispersion wavelengths are determined portion by portion and the distribution of zero dispersion wavelengths can be measured over the whole length of the optical fiber under testing 6.

Figure 4:
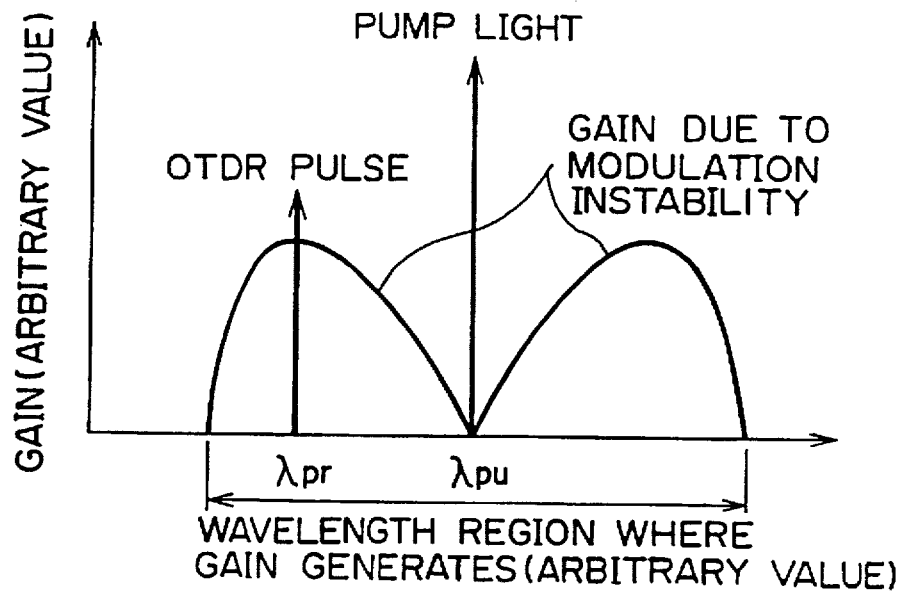
FIG. 4 is a diagram showing the relation between a pump light wavelength $\lambda pu$ and an OTDR pulse wavelength $\lambda pr$.

The wavelength $\lambda_{pu}$ of the pump light and the wavelength $\lambda_{pr}$ of the OTDR pulse can be selected arbitrarily but need to be set in such a manner that the OTDR pulse can experience a gain due to modulation instability induced by the pump light, that is, $\lambda_{pr}$ is set within the wavelength region where a gain caused by modulation instability occurs, as shown in FIG. 4. Therefore, the respective wavelengths $\lambda_{pu}$ and $\lambda_{pr}$ of the pump light source 22 and the light source 12 in the optical time domain reflectometer 10 are tunable. A light source having a wide bandwidth and a wavelength tunable filter for cutting out a part of the wide bandwidth may be used in place of a wavelength tunable light source.

The modulation instability occurs within only an anomalous dispersion region. As shown in FIG. 3, the smaller the absolute value of the dispersion value is or the closer to the zero dispersion wavelength the pump light wavelength is, the wider the bandwidth of the gain is. When the dispersion slope is s in the vicinity of the zero dispersion wavelength $\lambda_{ZD}$, the dispersion value D is given by the following equation (3), $$D = s \cdot (\lambda_{pu} - \lambda_{ZD}) \quad (3)$$

At this time, the above equation (2) can be rewritten as follows.

$$G = 4.343 \frac{|s \cdot (\lambda_{pu} - \lambda_{ZD})(\lambda_{pu} - \lambda_{pr})|}{2\pi \cdot \lambda_{pu}} \quad (4)$$

$$\left\{ \frac{8\pi \cdot n_2 \cdot c \cdot P_0}{\lambda_{pu} \cdot A_{\it eff} |(\lambda_{pu} - \lambda_{ZD})|} - \left[ \frac{c}{\lambda_{pu}} \right]^2 \cdot (\lambda_{pu} - \lambda_{pr})^2 \right\}^{1/2}$$

From equation (4), a relation between $\lambda_{pu}$ and $\lambda_{pr}$ and the gain G per unit length of the optical fiber can be calculated. There could be considered various ways to select $\lambda_{pu}$ and $\lambda_{pr}$ and the following two ways are representative:

(a) $\lambda_{pr}$ is set to be constant and $\lambda_{pu}$ is swept, and (b) the difference between $\lambda_{pu}$ and $\lambda_{pr}$ is set to be constant and $\lambda_{pu}$ is swept.

Figure 5:
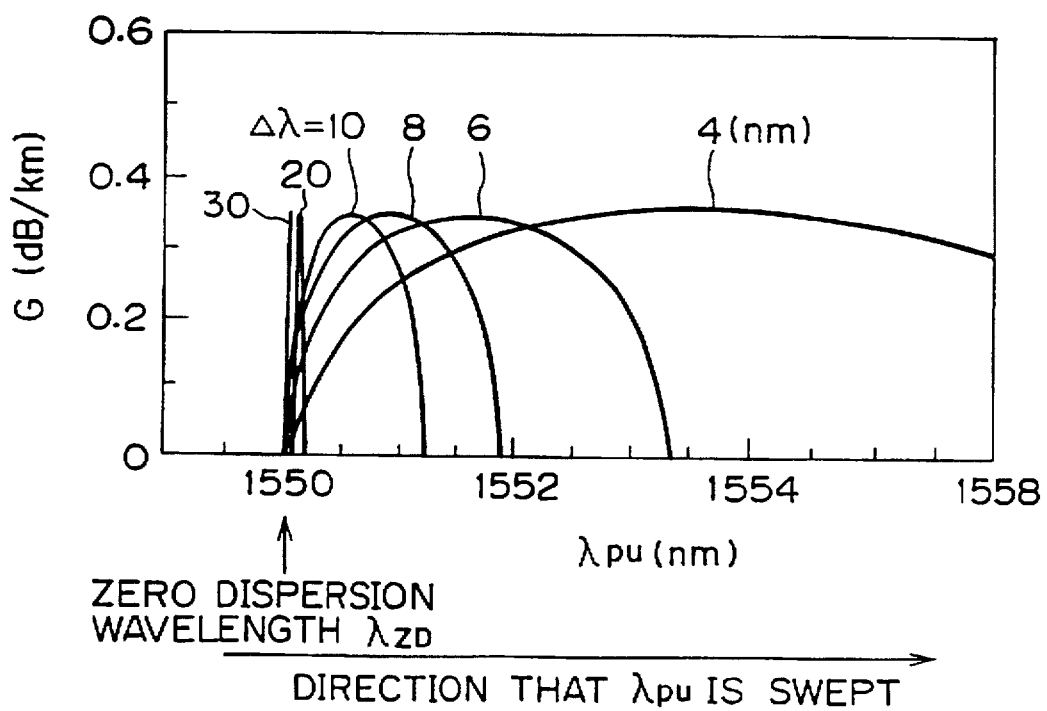
FIG. 5 is a diagram showing the relation between the pump light wavelength $\lambda pu$ and gain G per unit length of the optical fiber.

FIG. 5 shows the relation between the pump light wavelength $\lambda_{pu}$ and the gain G per unit length of the optical fiber when, in the case of (b) above, $(\lambda_{pu} - \lambda_{pr} = \Delta\lambda)$, $\Delta\lambda$ is changed to 4, 6, 8, 10, 20, and 30 (nm). Note that the parameters were set as follows: $\lambda_{ZD} = 1550$ (nm), s=0.07 (ps/km/nm$^2$), $P_0 = 100$ (mW), $A_{\it eff} = 50$ (μm$^2$), and $n_2 = 3.2 \times 10^{-16}$ (cm$^2$/W). As shown in FIG. 5, in the case where the pump light wavelength $\lambda_{pu}$ is swept from a shorter wavelength side to a longer wavelength side, the pump light wavelength at which the gain G per unit length rises is the zero dispersion wavelength $\lambda_{ZD}$.

If the difference between the wavelength $\lambda_{pu}$ of the pump light and the wavelength $\lambda_{pr}$ of the OTDR pulse becomes larger, the wavelength region where the gain ungenerated becomes narrower. Therefore, even if the wavelength at which the gain per unit length reaches a peak is considered as the zero dispersion wavelength $\lambda_{ZD}$ in place of determining the above-mentioned rising point, the error is small. However, there is in actual practice a problem in that the gain per unit length decreases and the sensitivity becomes lower. Therefore, these two wavelengths $\lambda_{pu}$ and $\lambda_{pr}$ need to be determined taking the precision of the wavelength setting, and available pump light power into account.

This will be described below more in detail.

In theory, if the pump light wavelength $\lambda_{pu}$ is continuously swept, it is possible to detect the gain even though the wavelength $\lambda_{pr}$ takes any value. In practice, however, since a problem arises when the wavelength $\lambda_{pr}$ is largely different from the wavelength $\lambda_{pu}$ or very close to the wavelength $\lambda_{pu}$, there is a range of $\lambda_{pr}$ suitable for the measurement. As shown in FIG. 5, if the wavelength $\lambda_{pr}$ is largely different from the wavelength $\lambda_{pu}$, the range of wavelength where any gain is generated when the wavelength $\lambda_{pu}$ is swept from the shorter wavelength side to the longer wavelength side with respect to the zero dispersion wavelength is limited to a small range from the zero dispersion wavelength. In FIG. 5, when $\Delta\lambda = 10$ nm the range of $\lambda_{pu}$ in which the gain is generated is about 1.2 nm, but when $\Delta\lambda$ is made still greater, i.e., $\Delta\lambda = 30$ nm as shown in FIG. 5, the range of wavelength $\lambda_{pu}$ is limited to an extremely small range of about 0.1 nm. To say this another way, if the wavelength $\lambda_{pu}$ is constant, the zero dispersion wavelength range where any gain can be detected is 0.1 nm. Even in such a small wavelength range, if the optical fiber under testing has a substantially uniform distribution of zero dispersion wavelengths, a gain generation can be detected by the OTDR because the section where a zero dispersion wavelength is present in such small wavelength range is relatively long. However, in an optical fiber under testing having a remarkably changing distribution of zero dispersion wavelengths, the section where a zero dispersion wavelength is present in the small wavelength range becomes relatively shorter. Therefore, it is difficult to detect the local gain generation if the length of the section where gain occurs is shorter than the distance resolution of the OTDR. In order to improve the distance resolution of the OTDR, it is necessary to shorten the width of the optical pulse. However, the energy of an optical pulse decreases as the width of the optical pulse becomes shorter. For this reason, the detection of the back-scattering light waveform, which is originally difficult, becomes more difficult in the case of high resolution measurement. Assuming that the measurement is carried out using a commercially available OTDR for the 1550 nm band with a dynamic range of about 20 dB, which corresponds to a case where an optical fiber having a length of 50 km and a loss of 0.4 dB/km is measured, the distance resolution is about 100 m. As a result, a portion of the optical fiber under testing which has an inclination of the zero dispersion wavelength of 1 nm/km (=0.1 nm/100 m) or above cannot be measured in the above mentioned case of $\Delta\lambda = 30$ nm. This is not practical.

In order to widen the measurable range of the inclination of the zero dispersion wavelength, it is desirable to set $\Delta\lambda$ to be as small as possible. In the above example, $\Delta\lambda$ of 10 nm or below is required from the practical viewpoint in order to measure the variation in the zero dispersion wavelength of up to 10 nm/km.

On the other hand, if the wavelength $\lambda_{pr}$ is too close to the wavelength $\lambda_{pu}$, another problem arises, that is, the pump light cannot be eliminated by an optical filter. In order to generate a non-linear gain, the pump light generally needs to have a high intensity. However, if the pump light is strong, it is difficult to detect the back-scattering light waveform of the OTDR pulse (probe light) because the back-scattering light of the OTDR pulse is masked by the back-scattering light of the pump light or Fresnel reflection light from the terminal. In this case, one could consider cutting the Fresnel reflection light or the back-scattering light of the pump light using an optical filter. However, because the filtering characteristic of an optical filter is generally not an ideal rectangular shape, there is the problem that crosstalk from the wavelength $\lambda_{pu}$ to the wavelength $\lambda_{pr}$ occurs. For instance, in a case where an optical filter of the dielectric multilayer film type is used as the practical optical filter and the Fresnel reflection light or back-scattering light of the pump light is to be suppressed by 40 dB, the difference $\Delta\lambda$ between the wavelengths $\lambda_{pu}$ and $\lambda_{pr}$ is required to be 5 nm or above.

As described above, in a case where a commercially available OTDR (the dynamic range for measurement is about 20 dB) and a dielectric multilayer film type filter as a pump light cutting filter are used for measurement in the 1550 nm band, the wavelength $\lambda_{pr}$ satisfying the following condition is valid as a practical value:

$$\lambda_{pu}-10 \text{ nm} \leq \lambda_{pr} \leq \lambda_{pu}-5 \text{ nm}$$

or $$\lambda_{pu}+5 \text{ nm} \leq \lambda_{pr} \leq \lambda_{pu}+10 \text{ nm}$$

Figure 6:
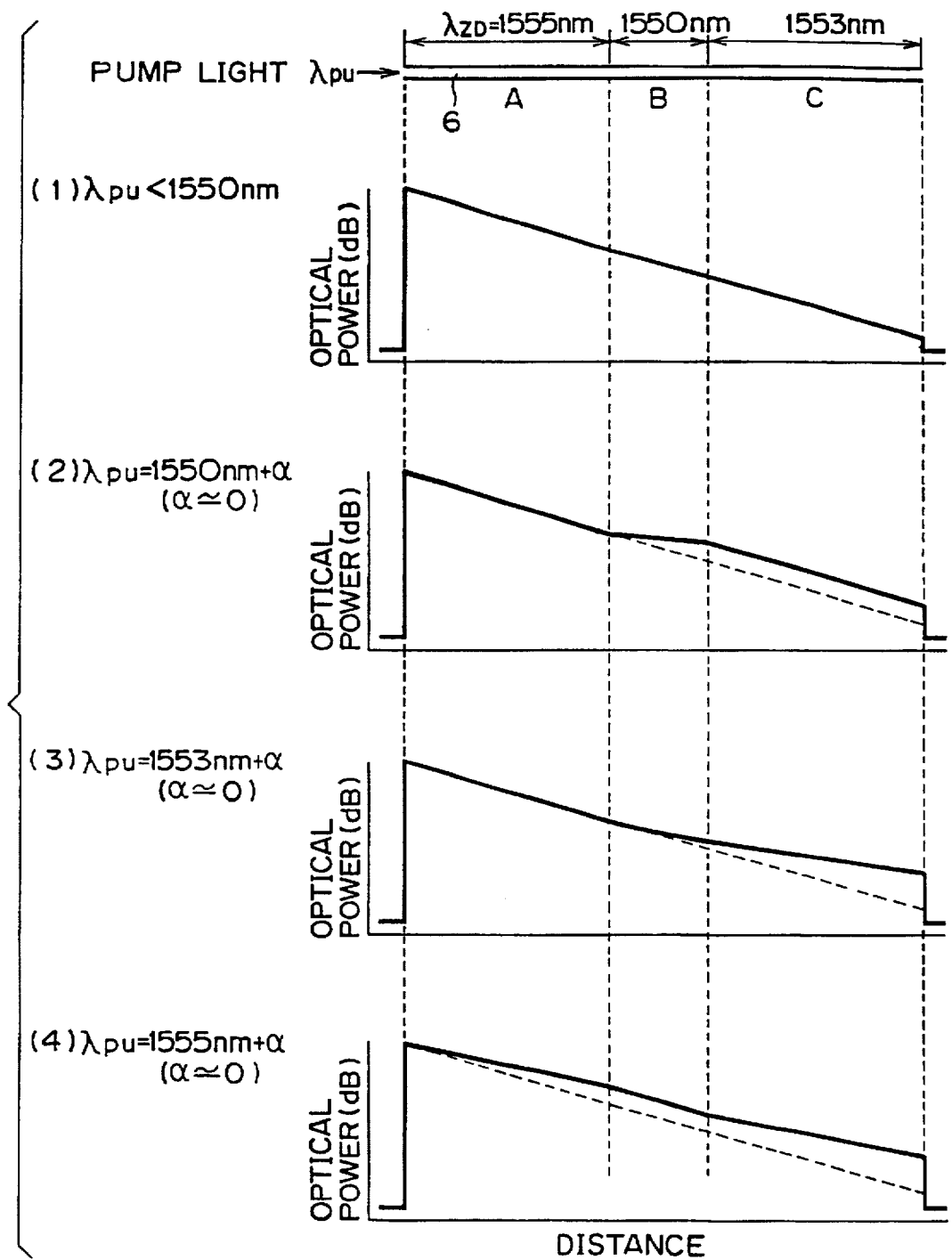
FIG. 6 shows back-scattering light waveforms of the OTDR pulse.

FIG. 6 shows waveforms of back-scattering light of an OTDR pulse. Here, the distribution of zero dispersion wavelengths of the optical fiber under testing 6 is composed of sections A (1555 nm), B (1550 nm) and C (1553 nm) from the input terminal of that optical fiber under testing in the order. Since in an ordinary optical fiber the shorter wavelength side of a zero dispersion wavelength is a normal dispersion region and the longer wavelength side thereof is an anomalous dispersion region, the pump light is swept from the shorter wavelength side to the longer wavelength side.

(1) In a range of $\lambda_{pu}$<1550 (nm), no modulation instability occurs because the optical fiber under testing is in the normal dispersion region over all the sections. The waveform of the back-scattering light of the OTDR pulse observed by the optical time domain reflectometer has the same waveform as in a case that there is no pump light.

(2) When $\lambda_{pu}$ slightly exceeds 1550 (nm), i.e., $\lambda_{pu}$=1550+ α, the section B is the anomalous dispersion region so that gain occurs due to the modulation instability. The value α is positive and a small value more than 0. That is, the waveform of the back-scattering light of the OTDR pulse observed by the optical time domain reflectometer shows that the inclination in the section B becomes gentle. In this manner, the zero dispersion wavelength $\lambda_{ZD}$ in the section B is determined to be 1550 (nm).

(3) When $\lambda_{pu}$ slightly exceeds 1553 (nm), i.e., $\lambda_{pu}$=1553+ α, the gain decreases in the section B. On the other hand, the section C goes in an anomalous dispersion region so that a gain occurs and the inclination of the waveform in the section C becomes gentle. In this manner, the zero dispersion wavelength $\lambda_{ZD}$ in the section C is determined to be 1553 (nm).

(4) When $\lambda_{pu}$ slightly exceeds 1555 (nm), i.e., $\lambda_{pu}$=1555+ α, gains in the sections B and C decrease. On the other hand, the section A goes in an anomalous dispersion region so that a gain occurs. As a result, the inclination of the waveform in the section A becomes gentle. In this manner, the zero dispersion wavelength $\lambda_{ZD}$ in the section A is determined to be 1555 (nm).

In this manner, by sweeping the wavelength $\lambda_{pu}$ of the pump light from the shorter wavelength side to the longer wavelength side to detect the gain, the zero dispersion wavelengths $\lambda_{ZD}$ are determined over all of the sections of the optical fiber under testing.

Figure 7:
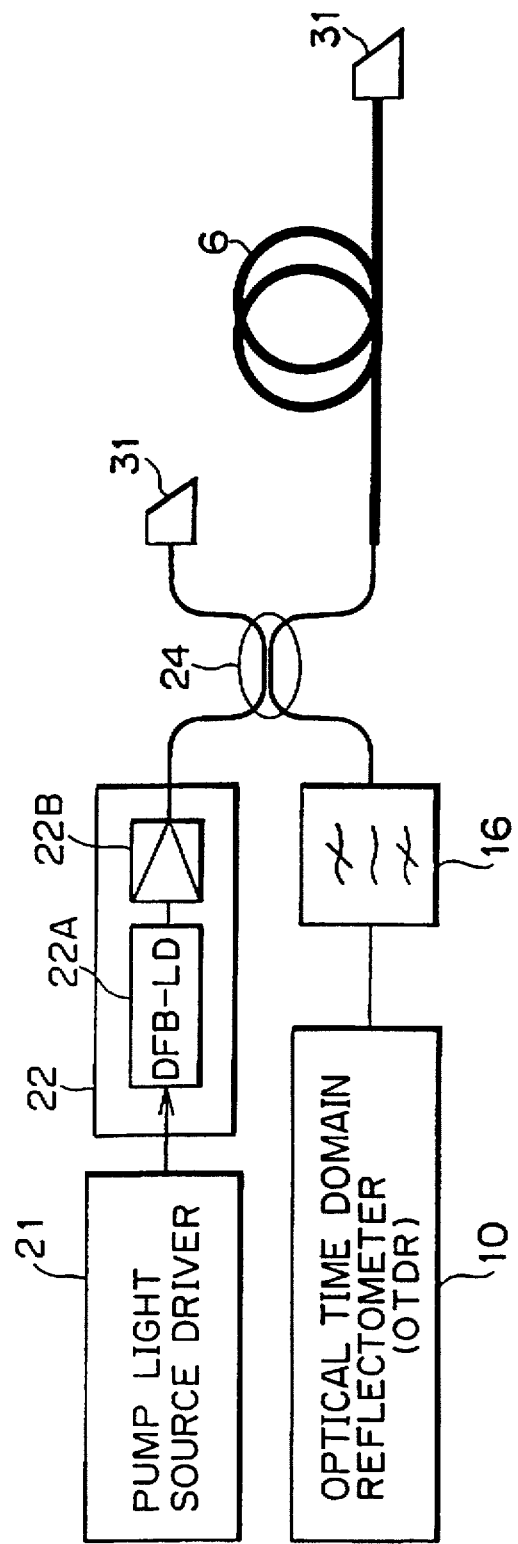
FIG. 7 is a block diagram showing details of the measuring apparatus according to an embodiment.

FIG. 7 is a block diagram showing the measuring apparatus according to the embodiment of the present invention in detail. In FIG. 7, the optical time domain reflectometer (OTDR) 10 has basically the same structure as that shown in FIG. 2. The pump light source 22 is composed of a 1.5 μm band distributed feedback laser diode (DFB-LD) 22A and an erbium doped fiber optical amplifier 22B and the multiplexer 24 is composed of a directional coupler. An optical band pass filter 16 is arranged between the optical time domain reflectometer 10 and the multiplexer 24 to allow only the OTDR pulses to pass through and to eliminate the back scattering light from the pump light. Further, anti-reflection terminals 31 are connected to an open end of the multiplexer 24 and an opposite end of the optical fiber under testing to eliminate reflection of the OTDR pulse and the pump light at the open ends.

When the DFB-LD is driven in a pulse operation, the generation of simulated Brillouin scattering in an optical fiber can be suppressed, because the line width of DFB-LD output is broadened and light pulse having high intensity peak power can be readily obtained from the optical amplifier, because the optical amplifier has average output power saturation characteristics. Note that the repetition frequency of the pump light is sufficiently greater than that of the OTDR pulse.

The OTDR pulse and the pump light are launched into the optical fiber under testing 6 and presence/absence of gain due to modulation instability induced by the pump light is detected from the back-scattering light waveform of the OTDR pulse observed by the optical time domain reflectometer 10. Then, the zero dispersion wavelength of a portion of the optical fiber under testing where the modulation instability occurs is determined from the pump light wavelength when the gain is detected.

Figure 8A:
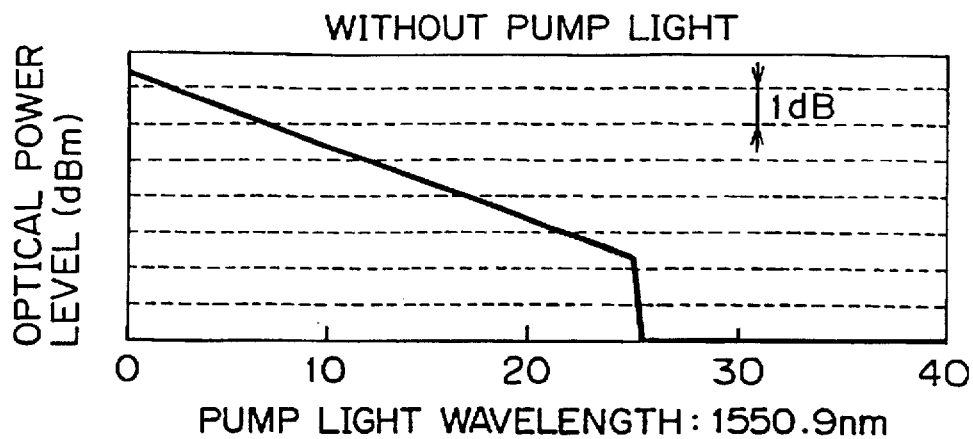
FIGS. 8A to 8C show the back-scattering light waveforms observed by the apparatus shown in FIG. 7, respectively.
Figure 8B:
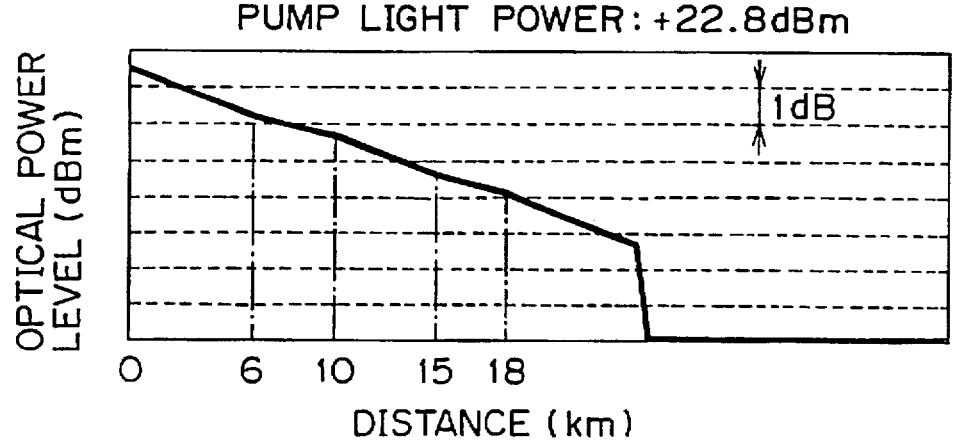
Figure 8C:
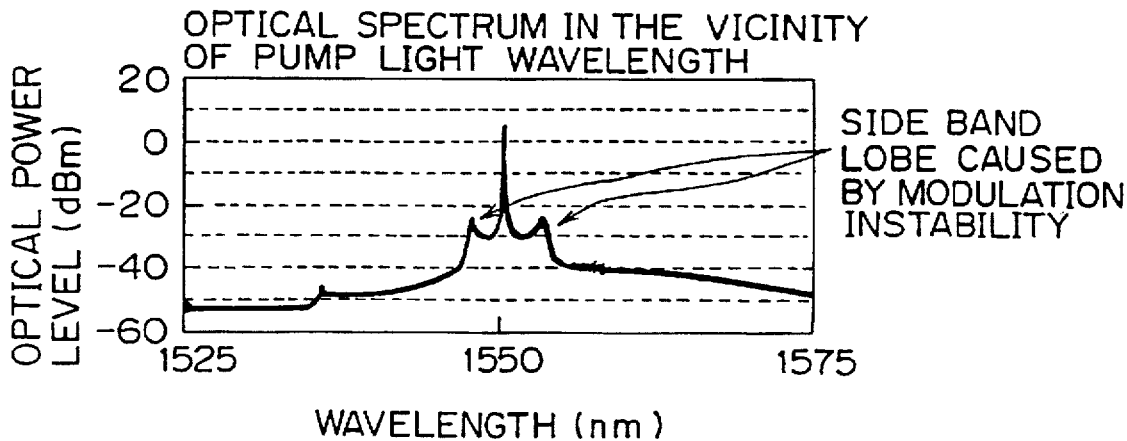

FIGS. 8A to 8C shows the back-scattering light waveforms of the OTDR pulse observed by the apparatus shown in FIG. 7. Note that the DFB-LD is directly modulated to output the pump light having an NRZ waveform of about 600 (Mb/s). FIG. 8A shows the back-scattering light waveform when there is no pump light or the pump light power is low and the optical fiber under testing shows an ordinary optical fiber loss characteristic. FIG. 8B is the back-scattering light waveform when the pump light power is large and the pump light wavelength is 1550.9 (nm). As seen from the figure, a gain occurs due to modulation instability at two sections of 6 to 10 (km) and 15 to 18 (km) from the input terminal of the optical fiber under testing. Therefore, the zero dispersion wavelength $\lambda_{ZD}$ in these sections is estimated to be 1550.9 (nm) or below.

In a case where it is recognized that gain occurs for the first time at that portion, when the pump light wavelength is swept from a shorter wavelength side to a longer wavelength side, it can be said that the zero dispersion wavelength at that portion is 1550.9 (nm) and the zero dispersion wavelength of the other portion exceeds 1550.9 (nm). Moreover, if the pump light wavelength is swept toward a further longer wavelength side, the zero dispersion wavelengths of the other portions can be determined portion by portion from the shorter wavelength side. In order to sweep the pump light wavelength, changing the temperature of DFB-LD is a simple and convenient method. The sweeping of the pump light wavelength may be performed using an external cavity laser or a distributed Bragg reflector laser diode (DBR-LD).

FIG. 8C shows an observational result of an optical spectrum in the vicinity of the pump light wavelength by an optical spectrum analyzer in place of the anti-reflection terminal 31 at the opposite end of the optical fiber under testing 6. When the peak power of the pump light is high, side band lobes were observed which could not be observed when the pump light power is low. These lobes are observed as a result that spontaneously emitted light output together with the pump light from the optical amplifier 22B is amplified by the gain due to modulation instability. Therefore, these lobes are evidence proving the validity of the measuring method according to the present invention.

Figure 9:
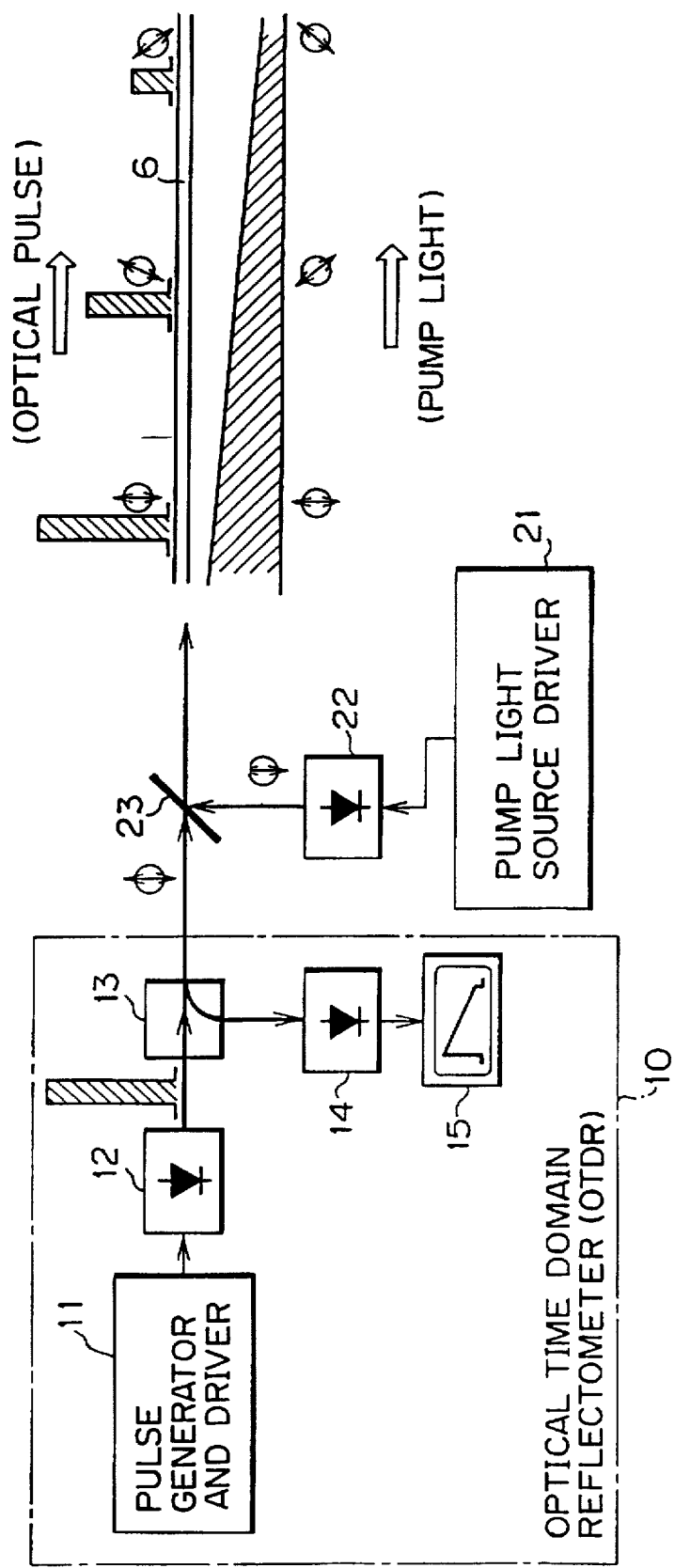
FIG. 9 is a schematic diagram showing the difference between the pump light and the OTDR pulse in polarization.

In order for the probe pulse (the OTDR pulse) to get the gain due to the pump light effectively, the Polarization of the probe pulse is desirably coincident with that of the pump light. However, the polarization states of the probe pulse and the pump light change during the Propagation in the optical fiber under testing and the polarization states after propagation are not necessarily coincident with each other between the probe pulse and the pump light. Thus, even if the Polarization of the OTDR pulse is made coincident with that of the pump light when both lights are launched into the optical fiber under testing, the polarization of the OTDR pulse is not always coincident with that of the pump light at a portion of the optical fiber under testing after propagation. The difference in polarization between the pump light and the OTDR pulse is schematically shown in FIG. 9. An arrow in FIG. 9 indicates a direction of the polarization.

In order to solve the above problem, it is preferable that two kinds of pump light or two kinds of OTDR pulses whose polarization states are orthogonal to each other are multiplexed and launched into the optical fiber under testing such that the polarizations of the pump light and OTDR pulse are coincident even if the polarization of the pump light or OTDR pulse is changed during the propagation in the optical fiber under testing. Alternatively, it is preferable that the gain of the OTDR pulse is time-averaged by making the polarization of pump light or OTDR pulse change randomly.

Figure 10:
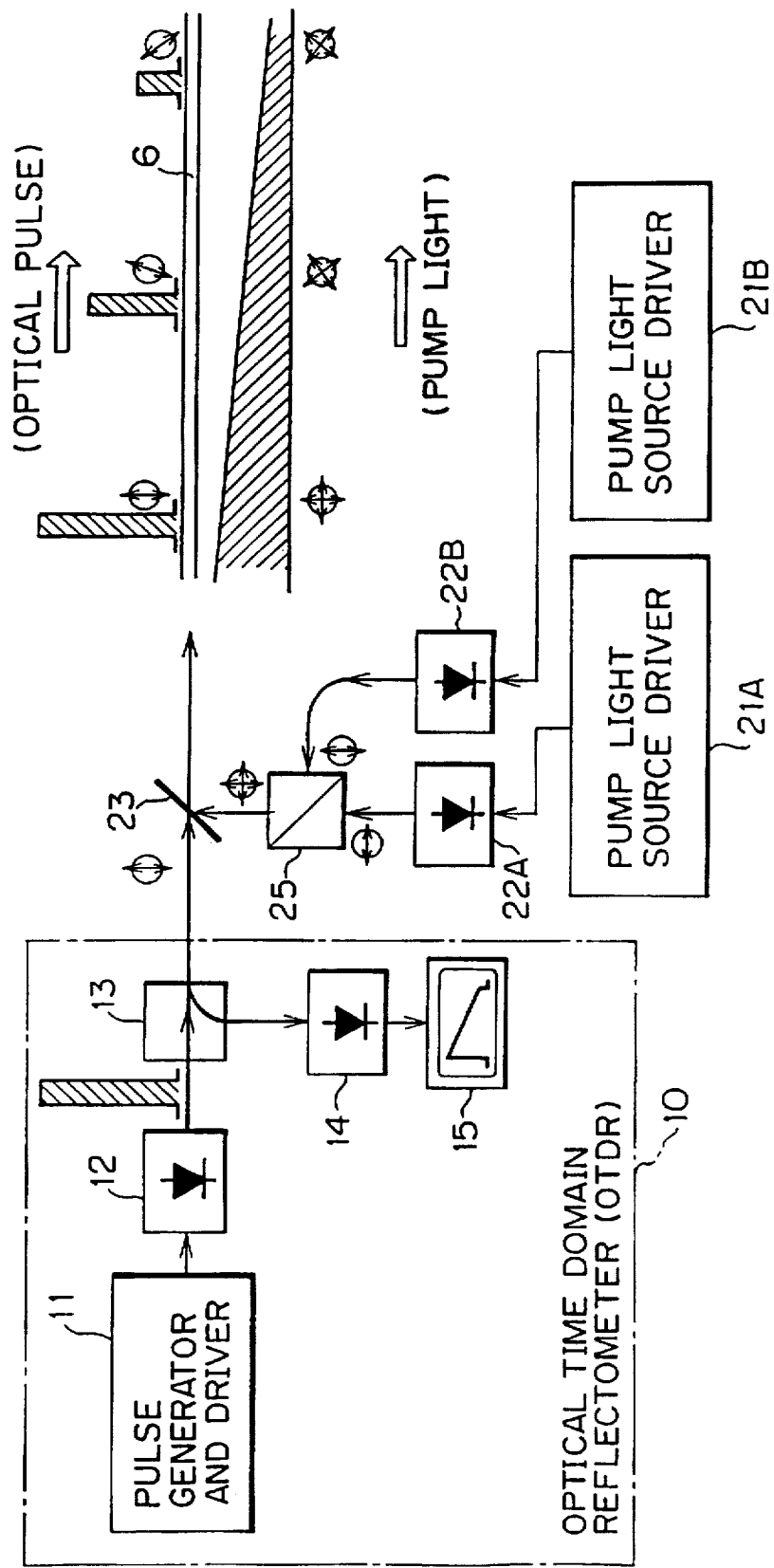
FIG. 10 is a block diagram showing an embodiment in which pump light is produced by polarization and multiplexing two kinds of pump light having polarization planes orthogonal to each other.

FIG. 10 is a block diagram showing a construction in which two types of pump light having polarization planes orthogonal to each other and having the same wavelength are generated by a pump light source driver 21A and a pump light source 22A; and a pump light source driver 21B and a pump light source 22B and are polarization multiplexed by a polarization multiplexer 25 to obtain the pump light. Also, FIG. 10 schematically shows the polarization states of the pump light and OTDR pulse at that time.

When a light having linear polarization at the input terminal of the optical fiber under testing is propagated in the optical fiber under testing, the polarization state changes, i.e., the light is typically changed to have elliptical polarization. This polarization state can be expressed by two polarization components. If two types of pump light having linear polarization orthogonal to each other and having the same intensity are polarization multiplexed and the thus multiplexed pump light is launched into the optical fiber under testing, the polarization multiplexed pump light can have the same intensity of polarization component with an arbitrary polarization direction in any portion of the optical fiber under testing. Therefore, by employing the construction shown in FIG. 10, even if the OTDR pulse polarization changes to have any of the polarization states such as a linear polarization state, an elliptical Polarization state, or a circular polarization state while the OTDR pulse Propagates in the optical fiber under testing, when the OTDR pulse Polarization is decomposed into two orthogonal polarizations, a polarization component of the pump light having the same intensity value is present in both the orthogonal polarizations which the OTDR pulse is decomposed into. Consequently, it can be expected that a non-linear gain of the OTDR pulse occurs without influence of the change in the polarization state.

Figure 11:
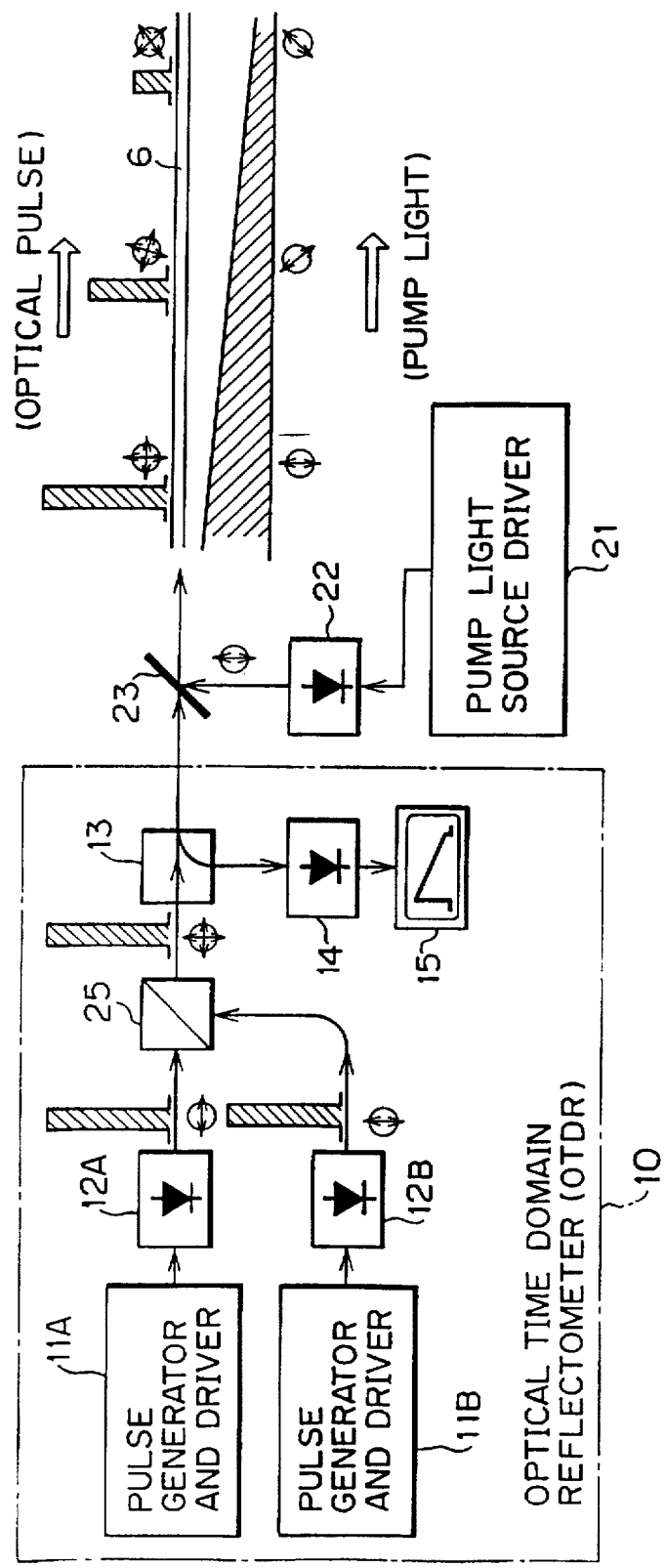
FIG. 11 is a block diagram showing an embodiment in which an OTDR pulse is produced by polarization and multiplexing two OTDR pulses having polarization planes orthogonal to each other.

FIG. 11 is a block diagram showing a construction in which two optical pulses having polarization planes orthogonal to each other and having the same wavelength are generated by pulse generation drivers 11A and 11B and wavelength tunable light sources 12A and 12B provided in the OTDR 10. The two pulses having linear and mutually orthogonal polarization are multiplexed by a polarization multiplexer 25 to obtain the OTDR pulse. Also, FIG. 11 schematically shows the polarization states of the pump light and OTDR pulse at that time.

By employing such a construction, similarly to the case of the pump light shown in FIG. 10, the OTDR pulse can have the same intensity of polarization component with an arbitrary direction in any portion of the optical fiber under testing. Therefore, even if the pump light polarization changes to have any of the polarization states such as a linear polarization state, an elliptical polarization state, or a circular polarization state while the pump light propagates in the optical fiber under testing, when the pump light is decomposed into two orthogonal polarizations, a polarization component of the OTDR pulse having the same intensity value is present in both the orthogonal polarizations which the pump light is decomposed into. Consequently, it can be expected that a non-linear gain of the OTDR pulse occurs without influence of the change in the polarization state.

Figure 12:
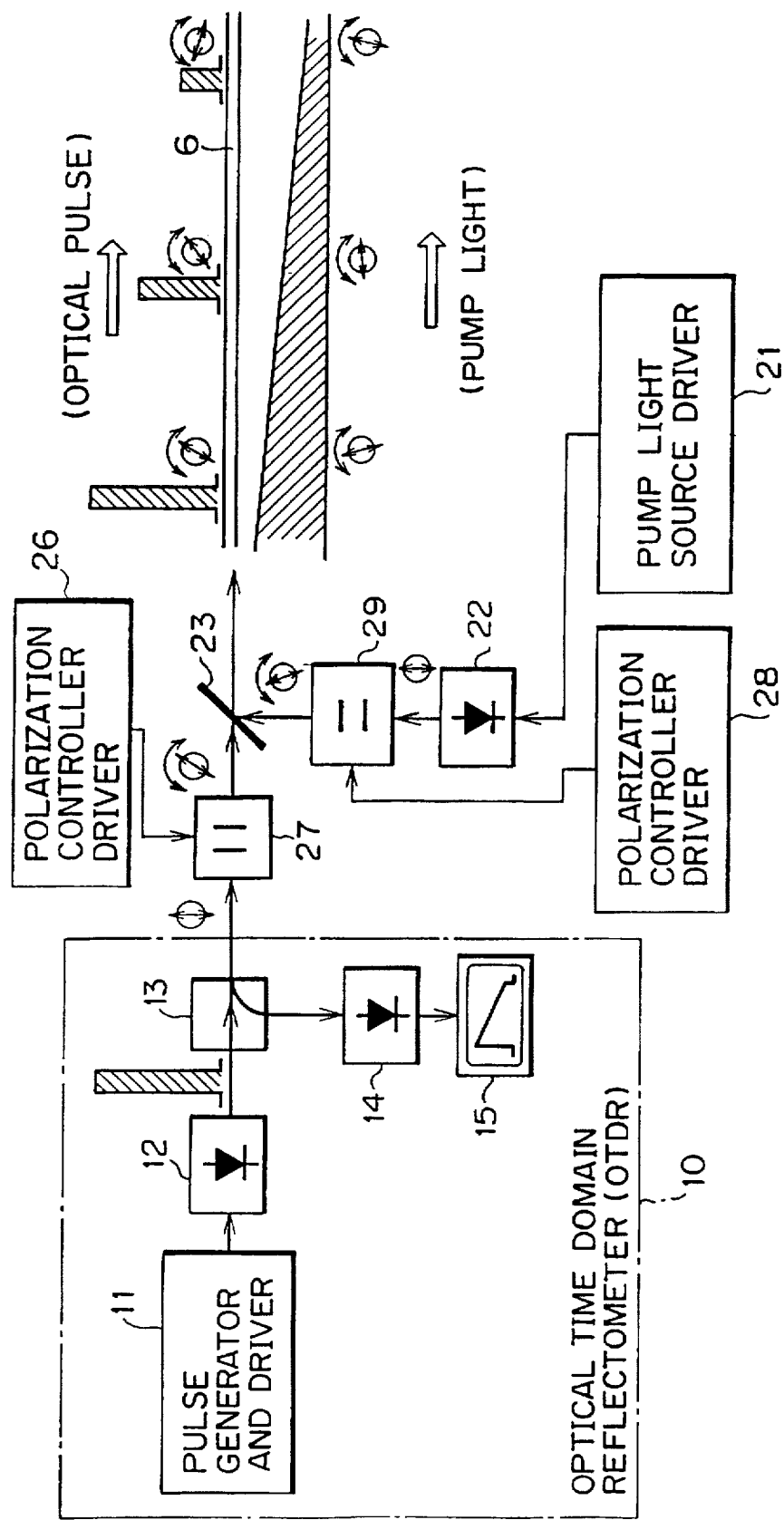
FIG. 12 is a block diagram showing an embodiment in which the polarization of the OTDR pulse and the pump light are randomly changed, respectively.

FIG. 12 is a block diagram showing a construction in which the polarization of the OTDR pulse is controlled by a polarization controller driver 26 and a polarization controller 27 such that the polarization of the OTDR pulse becomes random, and similarly, the polarization of the pump light is controlled by a polarization controller driver 28 and a polarization controller 29 such that the polarization of the pump light becomes random. Also, FIG. 12 schematically shows the polarization states of the pump light and OTDR pulse at that time. The randomizing of the polarization of either the OTDR pulse or the pump light may be enough to stabilize the gain generation.

If the polarizations of the pump light and OTDR pulse are made to independently, quickly and randomly vary, the polarization components of the pump light and OTDR pulse having the same polarization direction quickly and randomly change in time after both the pump light and OTDR pulse have propagated in the optical fiber under testing. Thus, the non-linear gain also changes. Therefore, if the non-linear gain is time-averaged, a stable average non-linear gain value can be obtained for relatively short averaging times. That is, the stable coincidence in time-average between polarizations can be obtained by forcedly varying the polarizations. This can be said to any portion of the optical fiber under testing. More particularly, the polarization state of at least one of the pump light and the OTDR pulse is changed at an input terminal and by averaging a plurality of the backscattering light waveforms of the OTDR pulses repetitively produced, a time-averaged gain generation portion of the optical fiber under testing is detected.

Regardless of the polarization states of the pump light and OTDR pulse propagating in the optical fiber under testing by the construction shown in FIGS. 10, 11 or 12, the OTDR pulse can experience stable gain or stable time-averaged gain due to the pump light.

Figure 13:
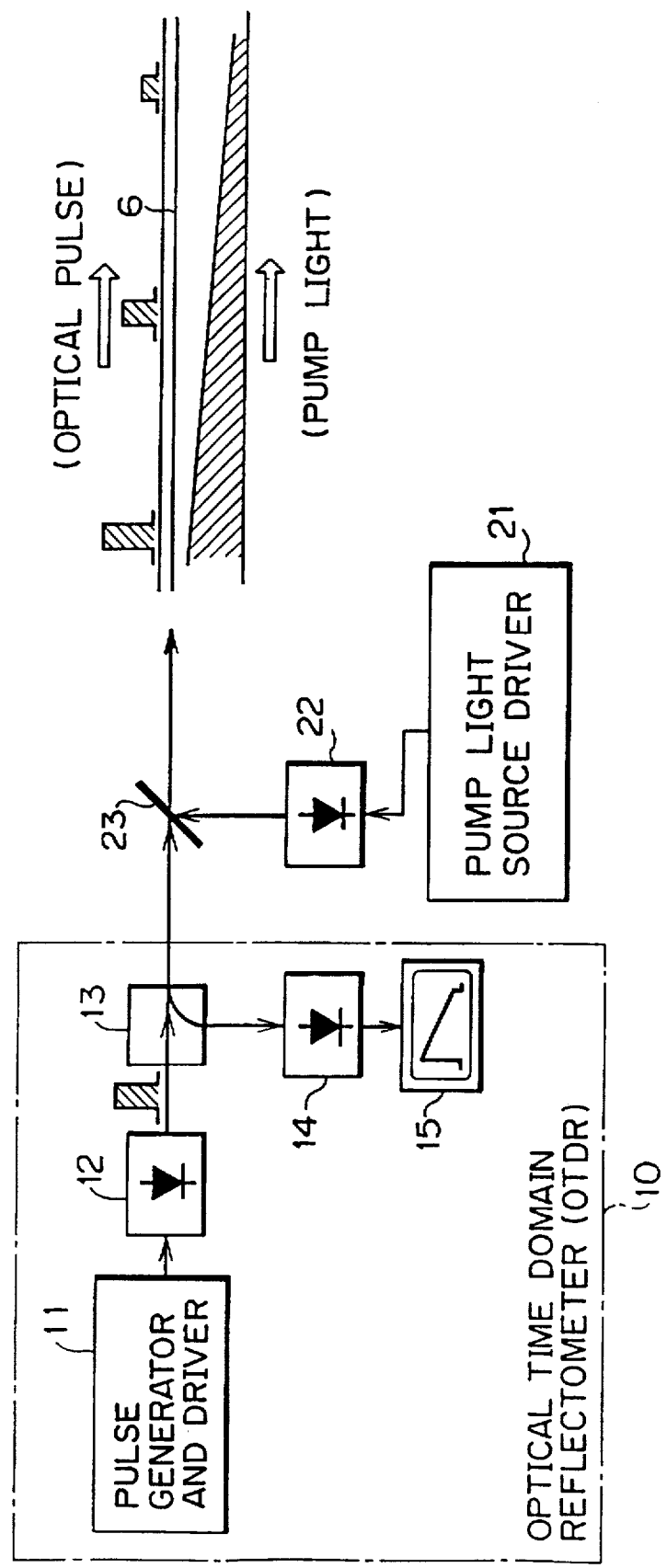
FIG. 13 is a schematic diagram showing the attenuation of the pump light.
Figure 14:
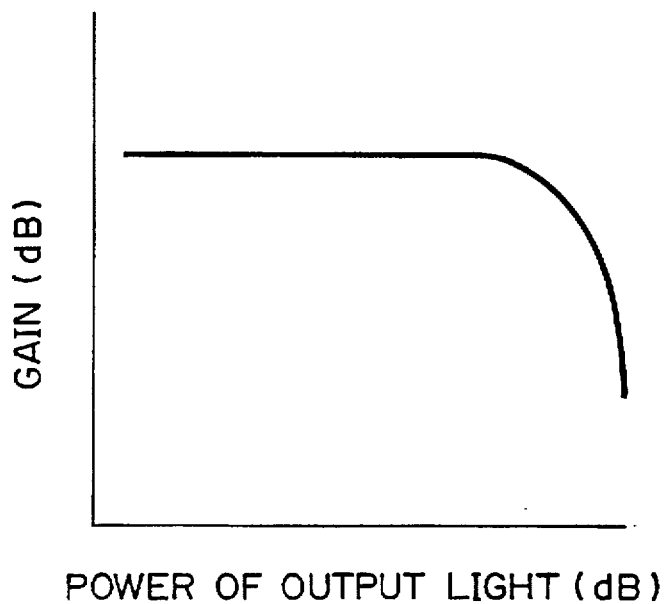
FIG. 14 is a graph showing the saturation characteristic of an optical fiber amplifier.

Further, as the pump light power increases more and more, the efficiency of the gain generation due to the non-linearity can be increased more and more. Thus, it is possible that the output power from a semiconductor laser source might not be sufficient for the pump light, i.e., that the pump light might attenuate in the optical fiber under testing so that the optical fiber under testing cannot be stimulated efficiently, as shown in FIG. 13. In this case, boosting the output of the semiconductor laser source by an optical amplifier could be considered. It is the most effective means at the present time that an amplifier using an erbium doped optical fiber (EDFA) is used for amplifying light in the 1.55 µm band. However, because EDFA has saturation characteristics as shown in FIG. 14 and due to loss of the optical fiber under testing even if the EDFA is used, it is not easy to obtain the pump light power required to make it possible to measure a zero dispersion wavelength in a portion of the optical fiber under testing far apart from the input terminal of the optical fiber under testing, e.g., in a portion where it is 50 km apart from the input terminal.

In order to solve the above problem, the average power amplification characteristic of the EDFA may be utilized. That is, because the maximum output power of the EDFA is limited with the average value, if the pump light is used in a sequence of pulses each having a small duration, it is possible to increase the peak power of each pulse of the pump light, keeping the same average power. As a result, the optical non-linear effect can be effectively obtained.

Figure 15:
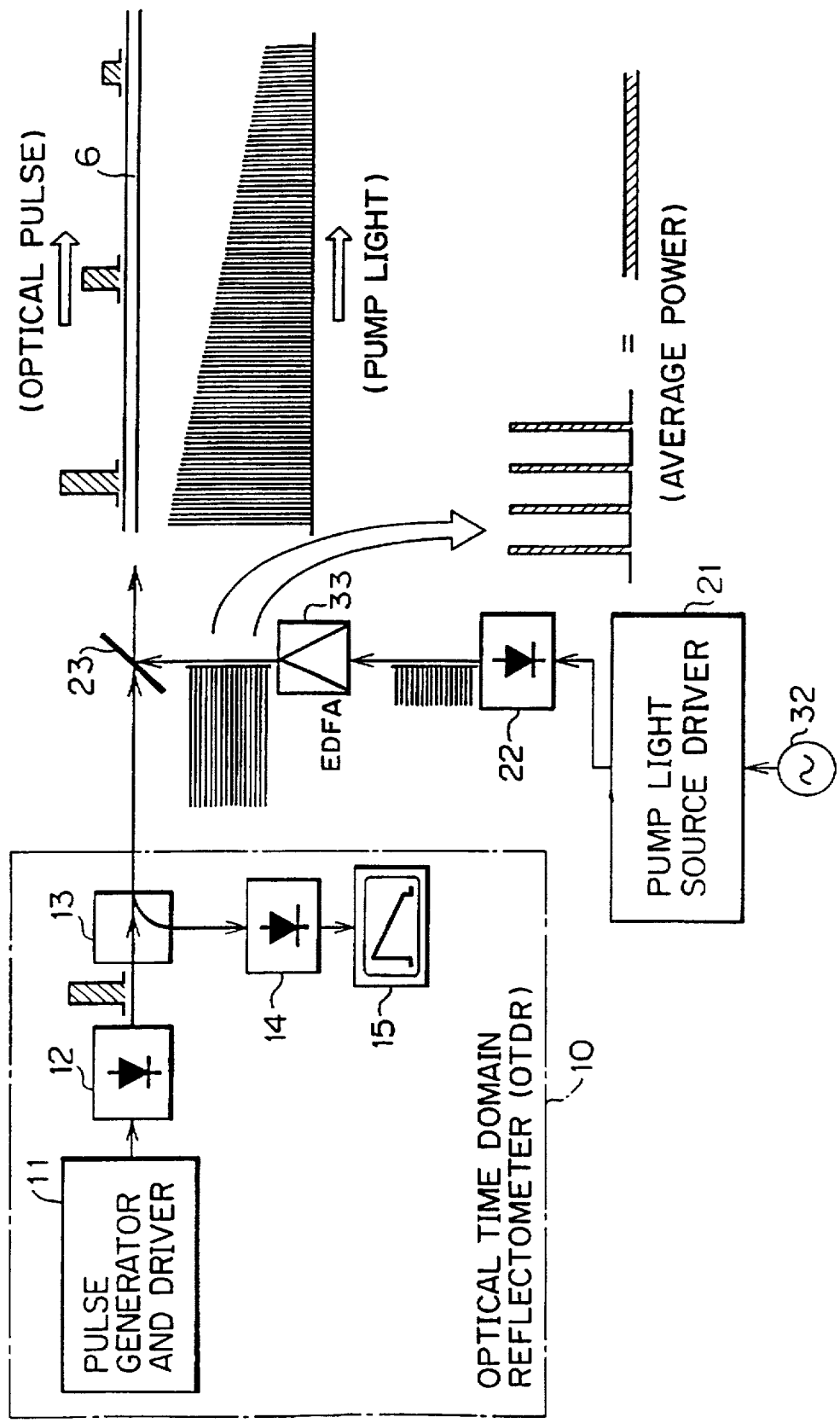
FIG. 15 is a block diagram showing an embodiment in which the pump light is changed into a sequence of pulses and amplified by an optical fiber amplifier.

FIG. 15 shows a construction in which a sequence of pulses is used as the pump light and the pump light pulses are amplified by an optical fiber amplifier 33 in which a light is directly amplified using a rare earth, such as erbium, doped optical fiber. The duration of each pulse of the pump light is shorter than that of the OTDR pulse and the repetitive frequency of the pulses of the pump light is such that a plurality of pulses of the pump light is present in the duration of the OTDR pulse. For instance, it is assumed that the optical fiber amplifier saturates at a maximum output power is 100 mW. If the pump light is continuous, the peak power of the pump light amplified by the optical fiber amplifier is kept to 100 mW. However, if the pump light is a sequence of pulses having a repetitive frequency of 100 MHz , i.e., a repetitive period of 10 ns and a duration of 1 ns, the duty ratio of the pulse is 1/10 and the peak power of each pulse of the pump light can be 1 W for the average power amplification characteristic of the optical fiber amplifier. Therefore, even if the average power is the same value of 100 mW, the efficiency of the non-linear gain generation can be increased.

Figure 16:
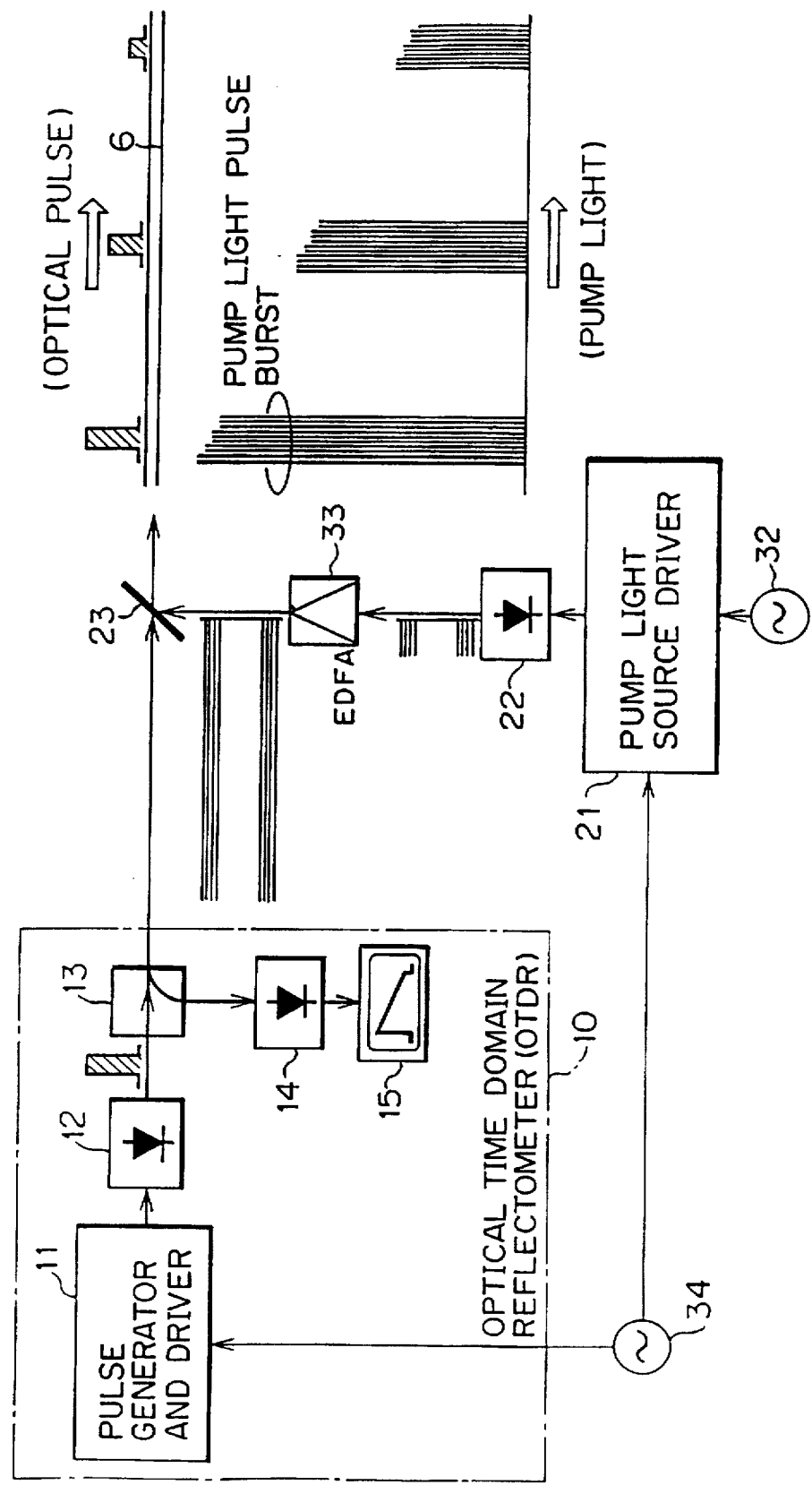
FIG. 16 is a block diagram showing an embodiment in which the pump light is changed into a pulse sequence burst and is synchronized with the OTDR pulse.

FIG. 16 shows a construction in which a burst state of the pulse sequence of the pump light is used in place of the pulse sequence with a repetition frequency and the pulse burst of pump light and the OTDR pulse are synchronized with each other using a common oscillator 34 and launched into the optical fiber under testing. For instance, similar to the case shown in FIG. 15, it is assumed that the optical fiber amplifier saturates in its output and that its maximum output power is 100 mW. In the case shown in FIG. 15, although the pulse peak power of the pulse sequence of the pump light is 1 W, the pulses of the pulse sequence of the pump light which do not overlap the sequence of OTDR pulses do not contribute to the non-linear gain generation and the power corresponding to the not-overlapping pulses of the pump light is not effectively used. Therefore, if only the pulses of the pulse sequence of the pump light overlapping with the OTDR pulses during the propagation in the optical fiber under testing are amplified, it is more effective. For instance, assuming that the OTDR pulses have a repetition frequency of 10 kHz and duration of 1 μs, the pump light pulse bursts are synchronized with the OTDR pulses and the repetition frequency of the bursts is 10 kHz, i.e., the repetition period of the bursts is 100 μs. If the pulse burst has a burst width of 2 μs of have a margin to deviation of the pump light pulses from the OTDR pulses during propagation in the test optical fiber under testing, the burst time occupation ratio is 1/50. Therefore, an average duty ratio of the pulses is 1/500 obtained by multiplying 1/50 by the pulse time occupation ratio of 1/10 and the peak power of each pulse of the pulse bursts of the pump light as the output of the optical fiber amplifier can be 50 W. Therefore, even if the average power is the same value of 100 mW, the efficiency of the non-linear gain generation can be increased.

By the construction shown in FIGS. 15 or 16, since the peak power of the pump light can be increased the optical non-linear effect can be effectively achieved.

Next, an embodiment will be described below in which the distribution of zero dispersion wavelengths of the optical fiber under testing is measured from the observation of the second phenomenon of the above-mentioned modulation instability phenomena.

Figure 17:
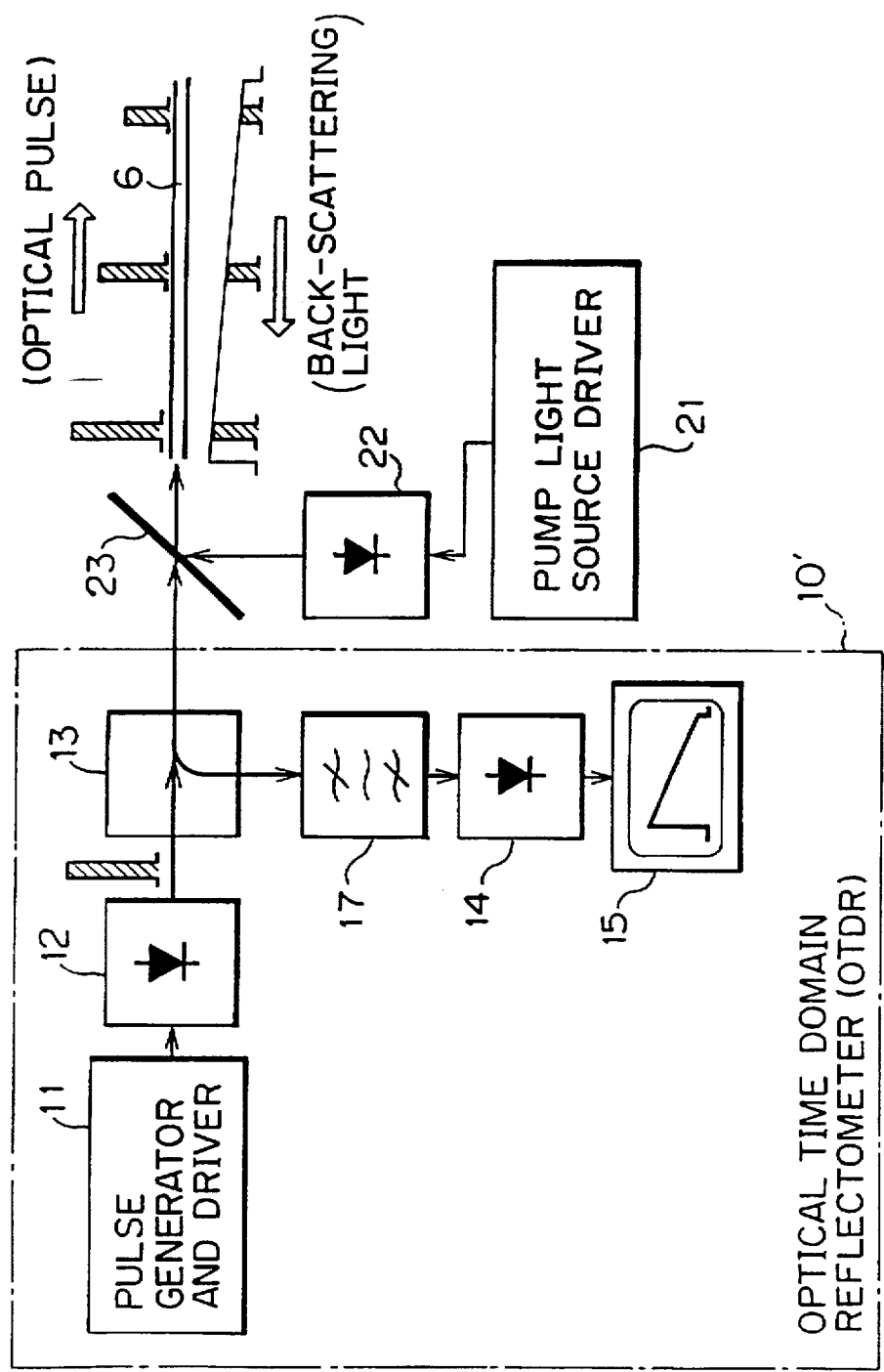
FIG. 17 is a block diagram showing the second basic construction of a measuring apparatus for measuring the distribution of zero dispersion wavelengths of the optical fiber.

FIG. 17 shows the second basic construction of the measuring apparatus for measuring the distribution of zero dispersion wavelengths of the optical fiber under testing. In FIG. 17, reference numeral 10' denotes an optical time domain reflectometer (OTDR) having an optical band pass filter 17 for passing through only a wavelength converted light pulse. The filter 17 is interposed before the high speed detector 14, in addition to the construction is otherwise like the optical time domain reflectometer 10 shown in FIG. 2.

Figure 18:
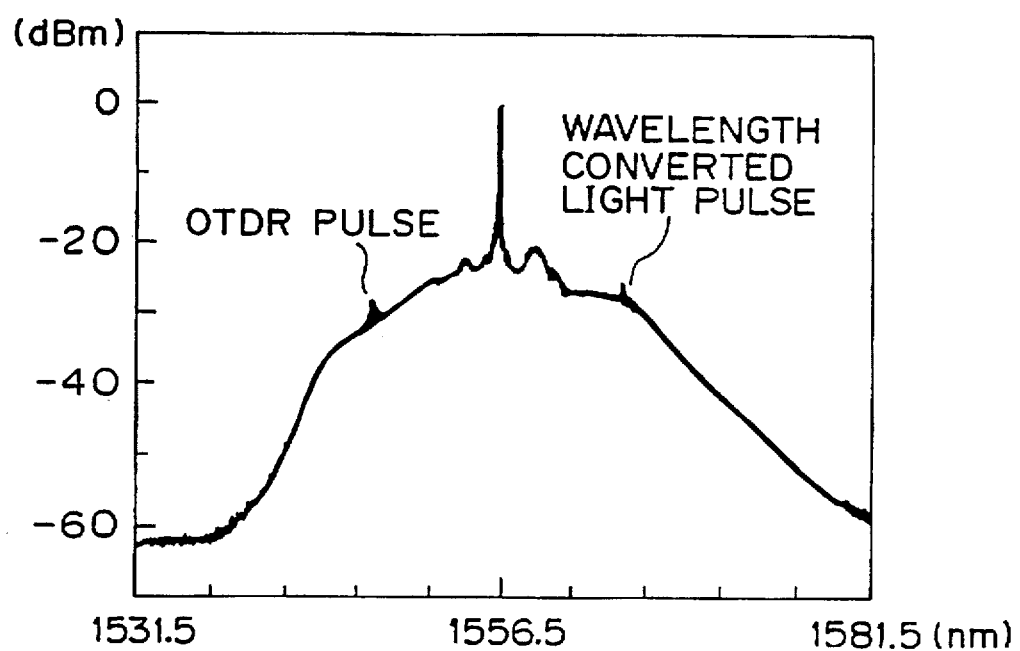
FIG. 18 is a diagram showing the relation between the OTDR pulse and a wavelength converted optical pulse.

FIG. 18 shows a relation between the optical pulse of the wavelength converted light and the OTDR pulse. This is the optical spectrum of the output light from the opposite terminal of the optical fiber under testing when the OTDR pulse and the pump light having the wavelength characteristic shown in FIG. 4 are launched into the input terminal of the optical fiber under testing. As shown in FIG. 18, an optical pulse of the wavelength converted light (1565 nm) is generated due to the modulation instability induced by the pump light on the side substantially opposite to the OTDR pulse (1548 nm) with respect to the pump light wavelength (1556.5 nm) as a symmetric axis. The distribution of zero dispersion wavelengths of the optical fiber under testing 6 can be measured by observing the back-scattering light waveform of only the wavelength converted light pulse through the optical band pass filter 17, as in the above-mentioned case.

Figure 19:
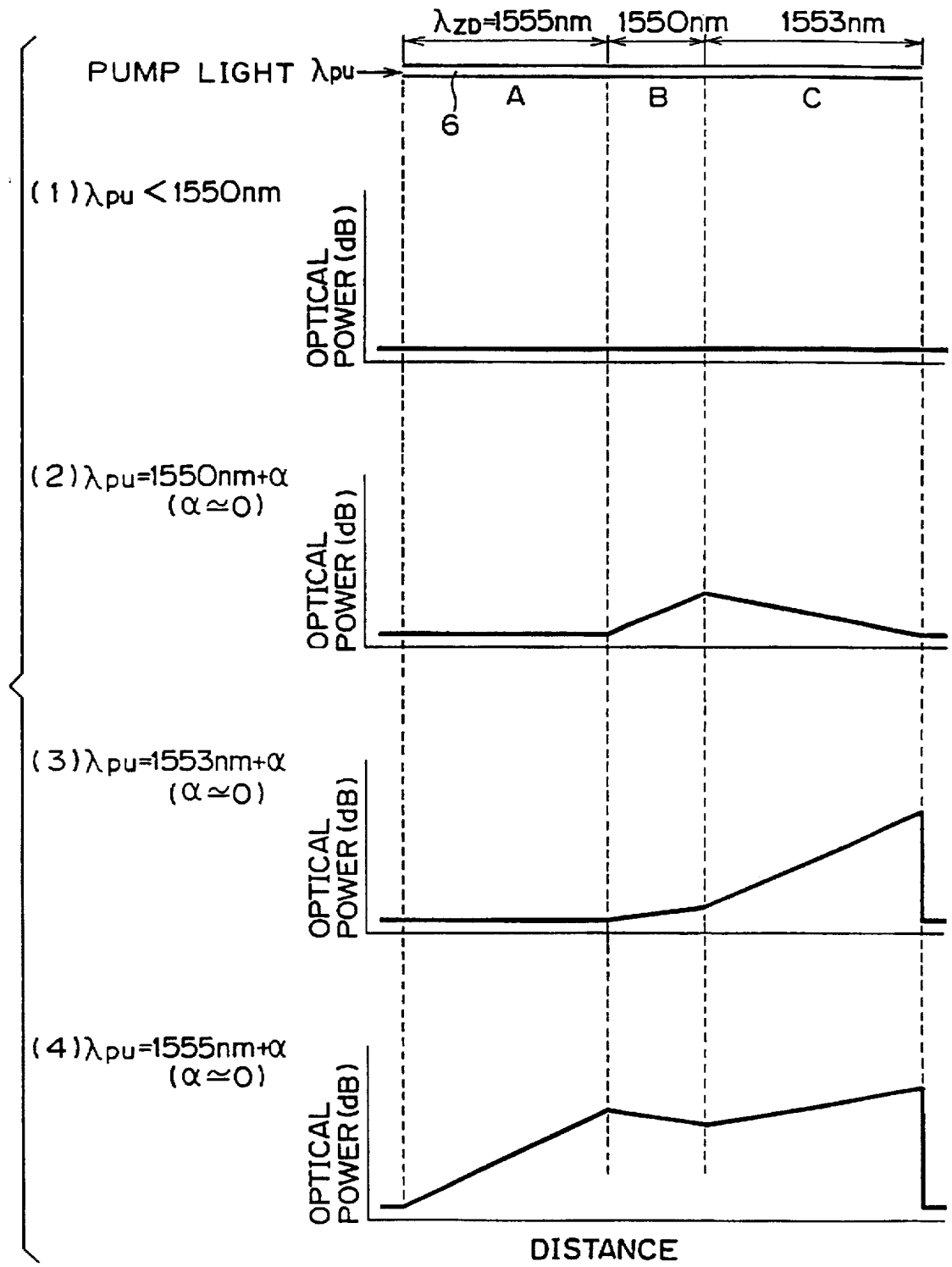
FIG. 19 is a diagram showing back-scattering light waveforms of the wavelength converted optical pulse.

FIG. 19 shows the back-scattering light waveform of the wavelength converted light pulse. Here, the distribution of zero dispersion wavelengths of the optical fiber under testing 6 is assumed to be composed of section A (1555 nm), section B (1550 nm) and C (1553 nm) from the input terminal of the optical fiber under testing in the order. Since in an ordinary optical fiber, the shorter wavelength side of a zero dispersion wavelength is a normal dispersion region and the longer wavelength side thereof is an anomalous dispersion region, the pump light is swept from the shorter wavelength side to the longer wavelength side.

(1) In a range of $\lambda_{pu}<1550$ (nm), no modulation instability occurs because all the sections of the optical fiber under testing are in the normal dispersion region. The back-scattering light of the wavelength converted light pulse is not observed by the optical time domain reflectometer.

(2) When $\lambda_{pu}$ slightly exceeds 1550 (nm), i.e., $\lambda_{pu}=1550+\alpha$, the section B becomes an anomalous dispersion region so that a wavelength converted light pulse is generated due to modulation instability. That is, the back-scattering light waveform of the wavelength converted light pulse observed by the optical time domain reflectometer has a small portion in the section B. Note that because the section C is a normal dispersion region, a wavelength converted light pulse does not occur and the wavelength converted light pulse generated in the section B attenuates due to the loss of the optical fiber under testing in the section C. In this manner, the zero dispersion wavelength $\lambda_{ZD}$ in the section B is determined to be 1550 (nm).

(3) When $\lambda_{pu}$ slightly exceeds 1553 (nm), i.e., $\lambda_{pu}=1553+\alpha$, the power of the wavelength converted light pulse that is generated in the section B is decreased. On the other hand, the section C goes into an anomalous dispersion region so that a wavelength converted light pulse is generated. In this manner, the zero dispersion wavelength $\lambda_{ZD}$ in the section C is determined to be 1553 (nm).

(4) When $\lambda_{pu}$ slightly exceeds 1555 (nm), i.e., $\lambda_{pu}$=1555+ α, the section A goes into an anomalous dispersion region so that a wavelength converted light pulse is generated. In this manner, the zero dispersion wavelength $\lambda_{ZD}$ in the section A is determined to be 1555 (nm).

In this manner, the wavelength $\lambda_{pu}$ of the pump light is swept from the shorter wavelength side to the longer wavelength side to detect the generation of the wavelength converted light pulse and the zero dispersion wavelengths $\lambda_{ZD}$ are determined over all the sections of the optical fiber under testing. Note that the methods shown in FIGS. 11 and 12 in which the stable detection of non-linear effects is performed suppressing uncertainty due to polarization state variations of the pump light and OTDR pulse, and the methods shown in FIGS. 15 and 16 in which a pulse sequence of the pump light is used and amplified by the optical fiber amplifier, can be employed in the construction shown in FIG. 17.

Next, an embodiment will be described below in which the distribution of zero dispersion wavelengths of the optical fiber under testing is measured from observation of the third phenomenon of the above-mentioned modulation instability phenomena.

Figure 20:
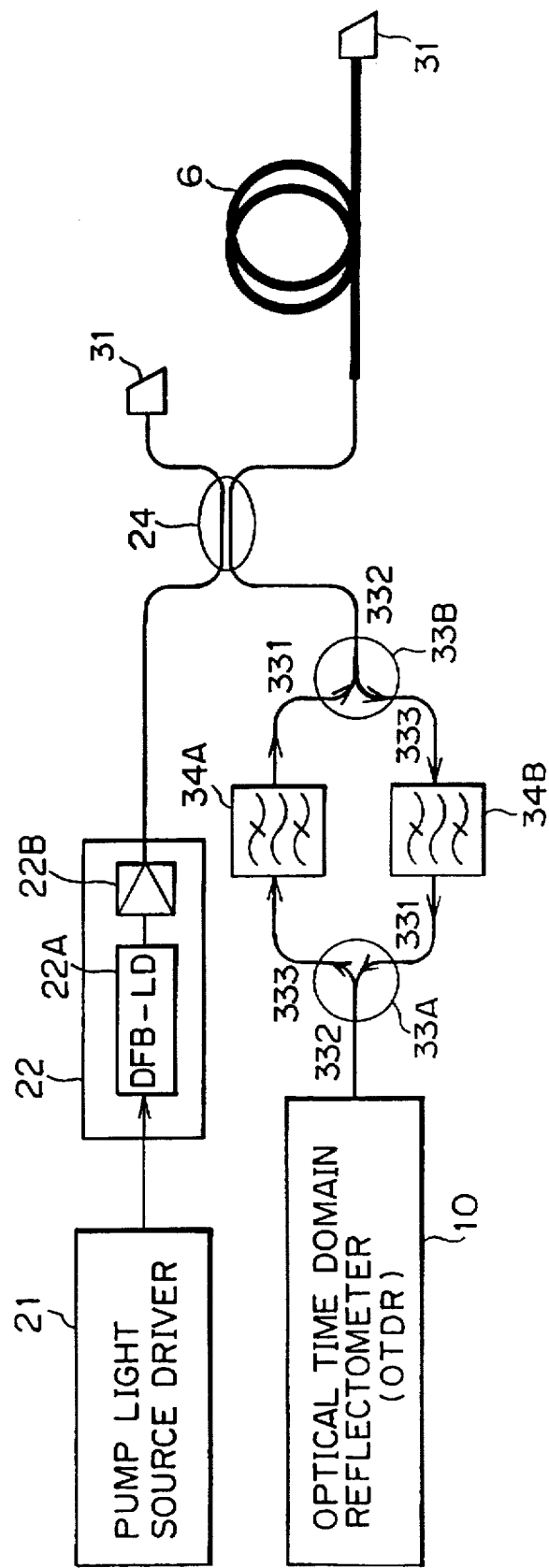
FIG. 20 is a block diagram showing details of the measuring apparatus according to another embodiment.

FIG. 20 shows a detailed block diagram of an apparatus for measuring the distribution of zero dispersion wavelengths in an optical fiber under testing 6 by observing the back-scattering light waveform of a wavelength converted light pulse. In FIG. 20, a directional coupler 24 is used in place of the multiplexer 23 as shown in FIG. 17, and two optical circulators 33A and 33B and two band-pass optical filters 34A and 34B are provided. The optical circulators 33A and 33B each have three ports 331, 332 and 333 and light incident to the port 331 comes out from the port 332 while light incident to the port 332 comes out from the port 333. The port 333 of the optical circulator 33A and the port 331 of the optical circulator 33B are connected via a band-pass optical filter 34A having a center wavelength 1550 nm of the transmission light and the port 333 of the optical circulator 33B and the port 331 of the optical circulator 33A are connected via a band-pass optical filter 34B having a center wavelength 1562 nm of the transmission light. Among the optical pulses coming out from the OTDR 10 and incident to the port 332 of the optical circulator 33A, a pulse with the wavelength 1550 nm is cut out by the optical filter and is launched into the optical fiber under testing 6 through the optical coupler 24 together the pump light. While among the light returned from the optical fiber under testing 6 and being incident to the port 331 of the optical circulator 34B, only the light with the wavelength of 1562 nm is incident to the OTDR 10. In this case the optical filter 17 shown in FIG. 17 is needless.

By using the apparatus as shown in FIG. 20, the pump light with a wavelength of 1556 nm and the OTDR pulse with a wavelength of 1550 nm were launched into the optical fiber under testing 6 and waveform of the returned light from the optical fiber under testing 6 only with a wavelength of 1562 nm, that is the wavelength of the wavelength converted light was observed.

Figure 21:
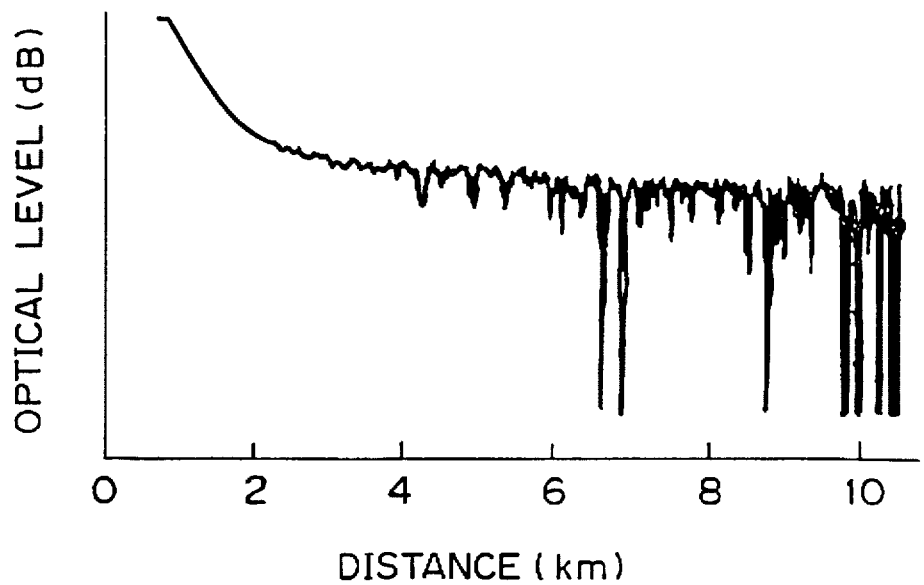
FIGS. 21 and 22 show the block-scattering light observed by the apparatus shown in FIG. 20, respectively.
Figure 22:
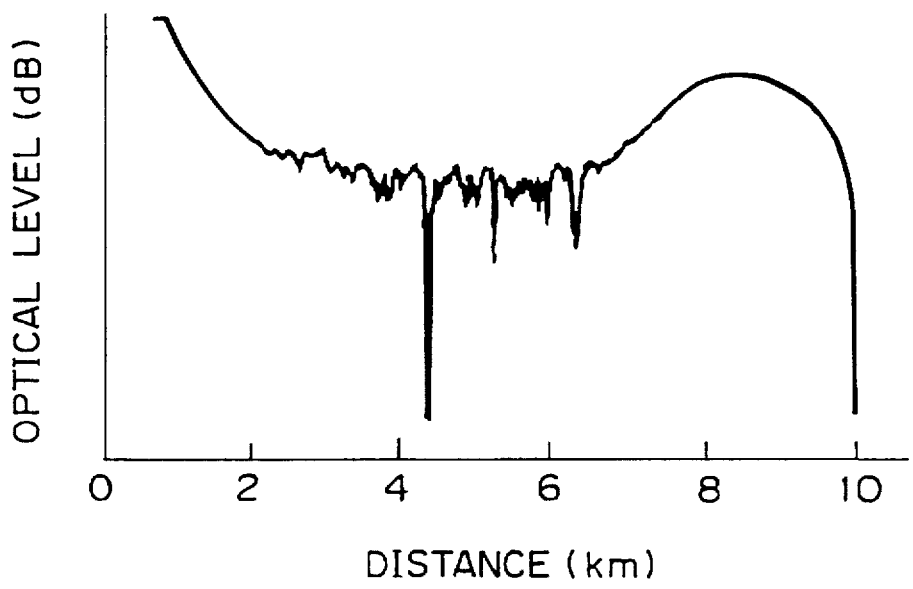

At first, the waveform of returned light with a wavelength of 1562 nm from the optical fiber under testing 6, that is the distribution of the power of the returned light in the distance of the optical fiber under testing 6, when only the OTDR pulse is launched into the optical fiber without the pump light is shown in FIG. 21. There is no back-scattering light. Only uniform noise due to an ASE (Amplified Spontaneous Emission) of the optical amplifier 22B in the pump pulse source is observed. When the power of the launched pump pulse is small, the waveform of the returned light is the same as shown in FIG. 21. FIG. 22 shows the waveform of the returned light from the optical fiber 6, that is, the back-scattering optical light of the idler pulse converted only in a portion having anomalous and nearly zero dispersion, when the time average power of the pump pulse is large, such as 10 mW of time-averaged power. As shown in FIG. 22, the back-scattering light of the wavelength converted light pulse with a wavelength 1562 nm was observed in a distance range from around 6.5 km to 9.5 km from the input end of the optical fiber under testing 6. Accordingly, it is known that the portion of the optical fiber under testing 6 in this distance range has a relative dispersion for the light with the wavelength of 1556 nm. The zero dispersion wavelength of a portion of the optical fiber under testing 6 can be known by sweeping the pump pulse wavelength. That is, when the wavelength of the pump pulse is swept from a shorter wavelength to a longer wavelength, if the back-scattering light is observed firstly at a portion, the wavelength at which the back-scattering light is firstly observed can be concluded as the zero dispersion wavelength of the portion. In this embodiment, at the portion with a distance of 6.5 km from the input end, back-scattering light of the wavelength converted light pulse was observed when the wavelength of the pump pulse reached 1556 nm, and therefore the zero dispassion wavelength of this portion of the optical fiber under testing 6 is 1556 nm.

Figure 23:
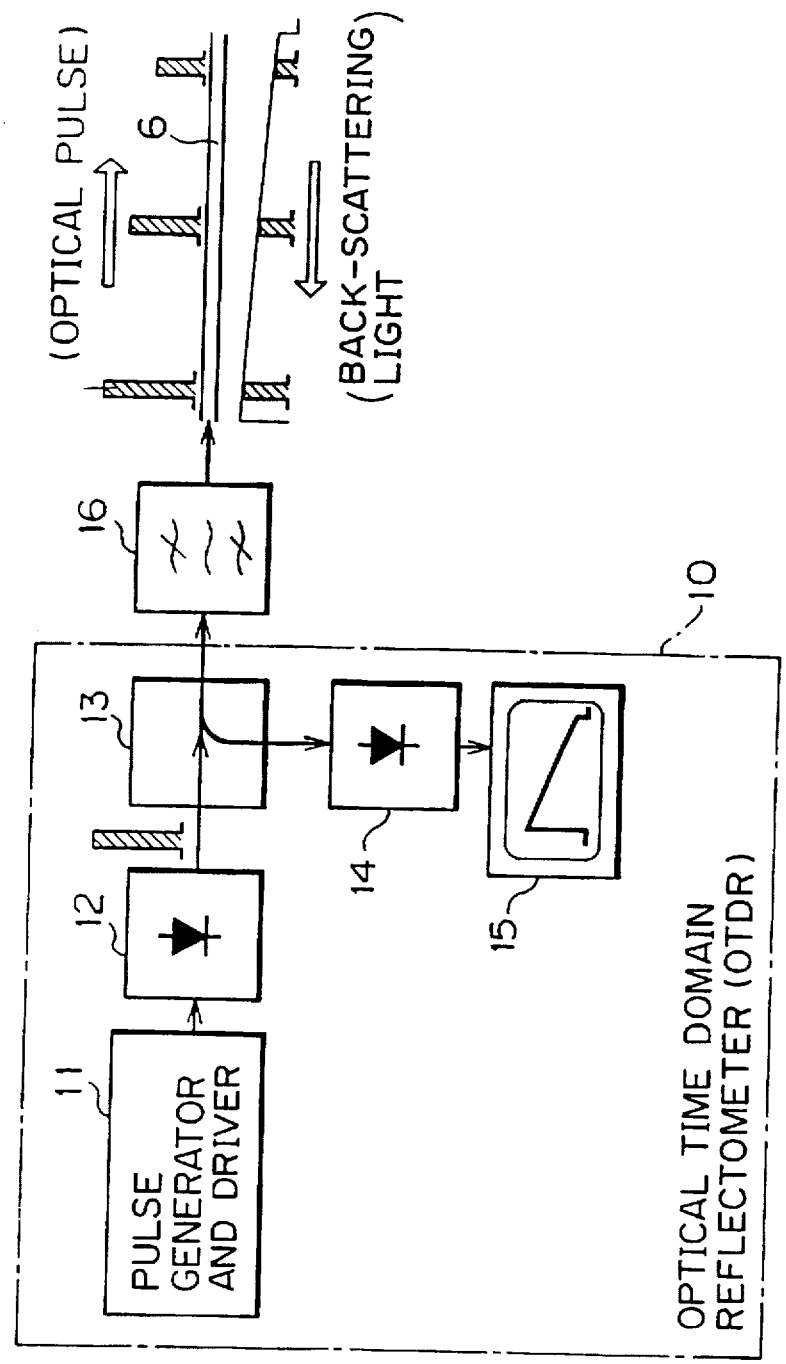
FIG. 23 is a block diagram showing the third basic construction of a measuring apparatus for measuring the distribution of zero dispersion wavelengths of the optical fiber.

FIG. 23 shows the third basic construction of the measuring apparatus for measuring the distribution of zero dispersion wavelengths of the optical fiber under testing. The construction, in which the OTDR pulse is launched into the optical fiber under testing 6 and the attenuation of the OTDR pulse itself is observed, includes the optical time domain reflectometer (OTDR) 10 and an optical band pass filter 16 for passing through only the OTDR pulse.

The wavelength of the OTDR pulse launched into the optical fiber under testing 6 is swept and when the light enters the anomalous dispersion region modulation instability occurs. The power of the OTDR pulse is converted into optical pulse power having a different wavelength at the modulation instability generating portion and the OTDR pulse itself attenuates. When the back-scattering light of the OTDR pulse is received by the optical time domain reflectometer 10 through the optical band pass filter 16, the back-scattering light waveform can be obtained in such a manner that the optical fiber loss increases at the modulation instability generating portion. Note that the optical band pass filter 16 may be arranged before the high speed detector 14.

Figure 24:
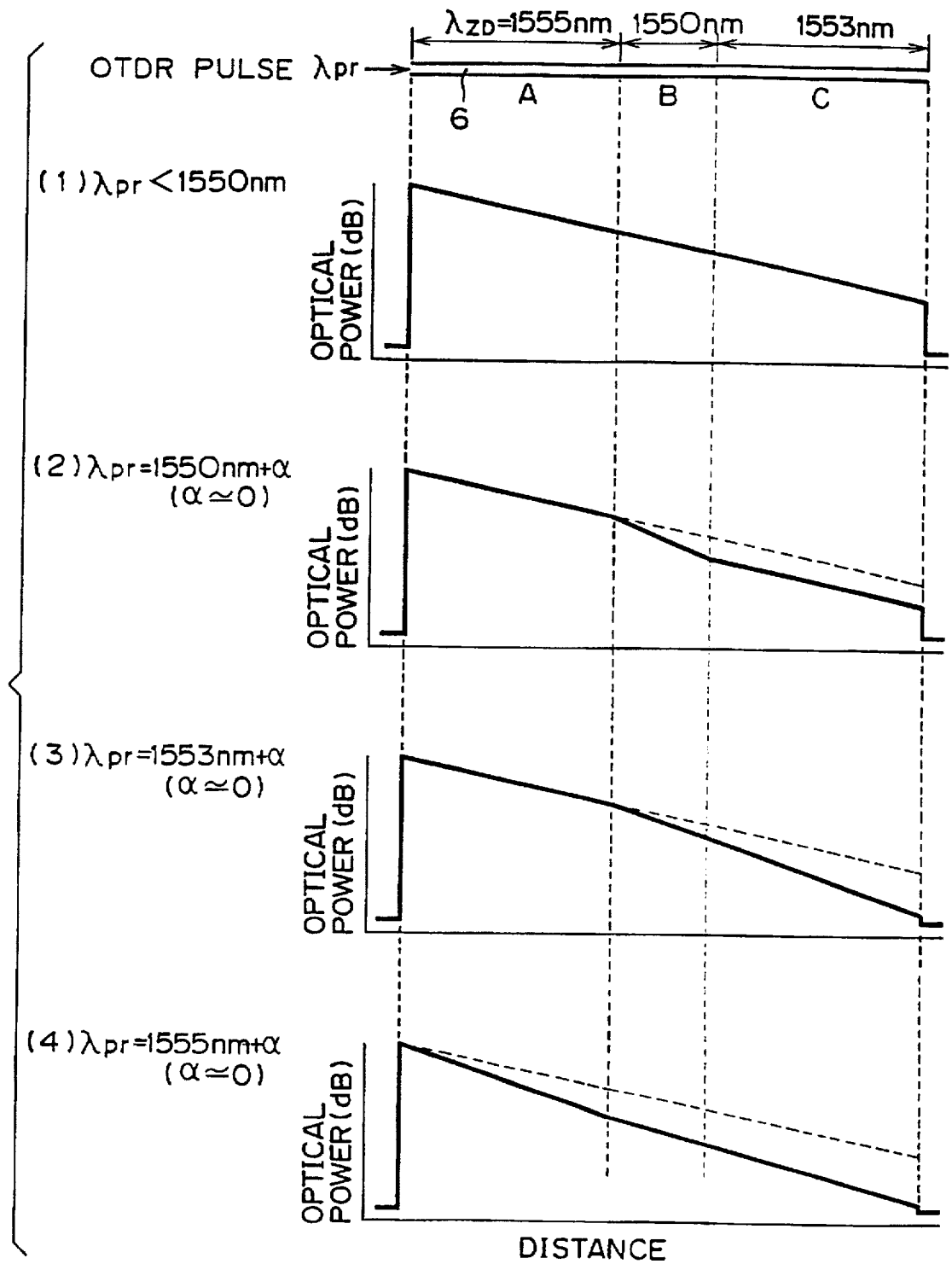
FIG. 24 is a diagram showing back-scattering light waveforms of the OTDR pulse.

FIG. 24 shows the back-scattering light waveform of the OTDR pulse. Here, the distribution of zero dispersion wavelengths of the optical fiber under testing 6 is assumed to be composed of section A (1555 nm), section B (1550 nm) and section C (1553 nm) from the input terminal of the optical fiber under testing in that order. Since in an ordinary optical fiber, the shorter wavelength side of a zero dispersion wavelength is a normal dispersion region and the longer wavelength side thereof is an anomalous dispersion region, the wavelength of the OTDR pulse is swept from the shorter wavelength side to the longer wavelength side.

(1) In a range of $\lambda_{pu}$<1550 (nm), no modulation instability occurs because all the sections of the optical fiber under testing are in the normal dispersion region. The back-scattering light of the OTDR pulse observed by the optical time domain reflectometer has no excess-attenuation.

(2) When $\lambda_{pu}$ slightly exceeds 1550 (nm), i.e., $\lambda_{pu}$=1550+ α, the section B becomes an anomalous dispersion region so that the OTDR pulse is attenuated due to modulation instability. That is, the back-scattering light waveform of the OTDR pulse observed by the optical time domain reflectometer has an excessively inclined portion in the section B. In this manner, the zero dispersion wavelength $\lambda_{ZD}$ in the section B is determined to be 1550 (nm).

(3) When $\lambda_{pu}$ slightly exceeds 1553 (nm), i.e., $\lambda_{pu}$=1553+ $\alpha$, the excess-attenuation in the section B becomes gentle. On the other hand, the section C goes into an anomalous dispersion region so that the OTDR pulse excessively attenuates such that the section C has an excess inclination. In this manner, the zero dispersion wavelength $\lambda_{ZD}$ in the section C is determined to be 1553 (nm).

(4) When $\lambda_{pu}$ slightly exceeds 1555 (nm), i.e., $\lambda_{pu}$=1555+ $\alpha$, the section A goes into an anomalous dispersion region so that the OTDR pulse is excessively attenuated such that the section A has an excess inclination. In this manner, the zero dispersion wavelength $\lambda_{ZD}$ in the section A is determined to be 1555 (nm).

In this manner, the wavelength $\lambda_{pr}$ of the OTDR pulse is swept from the shorter wavelength side to the longer wavelength side to detect the excess-attenuation of the OTDR pulse and the zero dispersion wavelengths $\lambda_{ZD}$ are determined over all the sections of the optical fiber under testing.

As described above, according to the present invention, the distribution $\lambda_{ZD}(z)$ of the zero dispersion wavelengths $\lambda_{ZD}$ can be measured over the whole length of the test optical fiber. Thereby, it is made possible to design a non-linear type transmission line in which local dispersion values are important as a parameter.

Moreover, if the distribution of zero dispersion wavelengths $\lambda_{ZD}(z)$ is determined, a distribution of dispersion values $D(z)$ can be estimated for a signal wavelength $\lambda_s$ in the vicinity of the zero dispersion wavelength. For instance, an average dispersion slope for a wavelength of a dispersion value in the vicinity of the average zero dispersion wavelength $\lambda_{ZD-ave}$ of a 1.5 μm dispersion-shifted fiber is generally considered to be $$\left[ \frac{\Delta D_{ave}}{\Delta \lambda} \right]_{\lambda=\lambda_{ZD-ave}} = 0.07 (ps/km/nm^2)$$

Using this, the distribution $D(z)$ of dispersion values for the signal wavelength $\lambda_s$ can be estimated as follows.

$$D(z) = \{\lambda_s - \lambda_{ZD}(z)\} \left[ \frac{\Delta D_{ave}}{\Delta \lambda} \right]_{\lambda=\lambda_{ZD-ave}}$$

Further, the modulation instability corresponds to a case where phase matching in four-wave mixing is performed based on self phase modulation and the same advantages of the present invention could be obtained even if there is utilized the four-wave mixing due to another type phase matching where the phase matching is performed at a wavelength in the vicinity of a zero dispersion wavelength.

The present invention has been described in detail with respect to preferred embodiments, and it will now be apparent that changes and modifications may be made without departing from the invention in its broader aspects, and it is the intention, therefore, in the appended claims to cover all such changes and modifications as fall within the true spirit of the invention.

What is claimed is:

1. A method for measuring a distribution of zero dispersion wavelengths in an optical fiber, comprising the steps of:

launching an optical pulse or an optical pulse and a pump light into said optical fiber from one end of said optical fiber;

observing at said one end of said optical fiber a back-scattering light waveform of said optical pulse, said waveform being indicative of a distribution of a power of said optical pulse in said optical fiber in a longitudinal direction;

measuring from the observed back-scattering light waveform a portion where modulation instability is induced in said optical fiber; and determining a zero dispersion wavelength at the portion of said optical fiber where the modulation instability is induced from a wavelength of said optical pulse or pump light.

2. A method as claimed in claim 1, wherein a probe optical pulse and a pump light are launched into said optical fiber as said optical pulse or optical pulse and pump light, and wherein a gain generation portion of said optical fiber, where a power of said probe optical pulse is amplified due to the modulation instability induced by said pump light, is detected from said back-scattering light waveform of said probe optical pulse indicative of the distribution of the power of the probe optical pulse in said optical fiber in the longitudinal direction, and wherein said zero dispersion wavelength of said gain generation portion of said optical fiber is determined based on said pump light wavelength.

3. A method as claimed in claim 2, further comprising the step of sweeping said pump light wavelength, each of the wavelengths at which amplification of said probe optical pulse power is detected in portions of said optical fiber being determined as said zero dispersion wavelength of each of said portions.

4. A method as claimed in claim 2, wherein a light obtained by polarization-multiplexing two types of light which have polarization planes orthogonal to each other and which have an identical wavelength and intensity is used as said pump light.

5. A method as claimed in claim 2, wherein a light obtained by polarization-multiplexing two kinds of light which have polarization planes orthogonal to each other and which have an identical wavelength and intensity is used as said probe optical pulse.

6. A method as claimed in claim 2, wherein an average gain generation portion of said optical fiber is detected by randomly changing the polarization state of at least one of said pump light and said probe optical pulse and by averaging a plurality of back-scattering light waveforms repetitively obtained in a state in which the polarization state of said pump light or said probe pulse at said one end of said optical fiber under testing on measuring said plurality of said back-scattering light waveforms are different from each other.

7. A method as claimed in claim 2, further comprising the steps of using a sequence of pulses as said pump light; and amplifying said sequence of pulses by an optical fiber amplifier which directly amplifies light using a rare earth doped optical fiber, and wherein a duration time of each of the pulses of said pump light is shorter than that of said probe optical pulse and a repetition frequency of the pulses of said pump light is such that there are a plurality of pulses of said pump light in the pulse duration time of said probe optical pulse.

8. A method as claimed in claim 7, wherein said sequence of pulses of said pump light is converted into a sequence of pulse bursts of said pump light and the sequence of pulse bursts of said pump light and said probe optical pulse are launched into said optical fiber synchronously.

9. A method as claimed in claim 1, wherein a probe optical pulse and a pump light are launched into said optical fiber as said optical pulse or optical pulse and pump light, wherein by detecting a back-scattering light waveform of a wavelength converted light pulse which has a wavelength substantially symmetric to said probe optical pulse wavelength with respect to said pump light wavelength as a symmetric axis on a wavelength spectrum, a portion of said optical fiber where the wavelength converted light pulse is generated due to the modulation instability induced by said pump light is detected, and wherein said zero dispersion wavelength of said portion of said optical fiber where the wavelength converted light pulse is generated is determined based on said pump light wavelength.

10. A method as claimed in claim 9, further comprising the step of sweeping said pump light wavelength, each of the wavelengths at which the generation of the wavelength converted light pulse is detected in portions of said optical fiber being determined as said zero dispersion wavelength of each of said portions.

11. A method as claimed in claim 9, wherein a light obtained by polarization-multiplexing two types of light which have polarization planes orthogonal to each other and which have an identical wavelength and intensity is used as said pump light.

12. A method as claimed in claim 9, wherein a light obtained by polarization-multiplexing two kinds of light which have polarization planes orthogonal to each other and which have an identical wavelength and intensity is used as said probe optical pulse.

13. A method as claimed in claim 9, wherein a portion of said optical fiber, where said wavelength converted light pulse is generated on an average, is detected by randomly changing the polarization state of at least one of said pump light and said probe optical pulse and by averaging a plurality of back-scattering light waveforms repetitively obtained in a state in which the polarization state of said pump light or said probe pulse at said one end of said optical fiber on measuring said plurality of said back-scattering light waveforms are different from each other.

14. A method as claimed in claim 9, further comprising the steps of using a sequence of pulses as said pump light; and amplifying said sequence of pulses by an optical fiber amplifier which directly amplifies light using a rare earth doped optical fiber, and
wherein a duration time of each of the pulses of said pump light is shorter than that of said probe optical pulse and a repetition frequency of the pulses of said pump light is such that there are a plurality of pulses of said pump light in the pulse duration time of said probe optical pulse.

15. A method as claimed in claim 14, wherein said sequence of pulses of said pump light is converted into a sequence of pulse bursts of said pump light and the sequence of pulse bursts of said pump light and said probe optical pulse are launched into said optical fiber synchronously.

16. A method as claimed in claim 1, wherein a kind of optical pulse is launched into said optical fiber as said optical pulse or optical pulse and pump light, wherein by observing a back-scattering light waveform of said optical pulse which indicates a power distribution of said optical pulse in said optical fiber in the longitudinal direction, an excess-loss generation portion of said optical fiber where the optical pulse power is excessively attenuated due to the modulation instability induced by said optical pulse is detected, and wherein said zero dispersion wavelength of said excess-loss generation portion of said optical fiber is determined based on said optical pulse wavelength.

17. A method as claimed in claim 16, further comprising the step of sweeping the optical pulse wavelength, each of the wavelengths in which the excess-attenuation of the optical pulse power is detected in portions of said optical fiber being determined as said zero dispersion wavelength of each of said portions.

18. A measuring apparatus for measuring a distribution of zero dispersion wavelengths of an optical fiber under testing, comprising:
pulse light source means for generating an optical pulse and launching said optical pulse into said optical fiber under testing from one end of said optical fiber under testing;
receiving means for receiving a back-scattering light of said optical pulse at said one end of said optical fiber under testing, said back-scattering light being generated in said optical fiber under testing; and
detecting means for generating a back-scattering light waveform indicative of a power distribution of said optical pulse in said optical fiber under testing in a longitudinal direction, and for detecting a portion of said optical fiber under testing where a modulation instability is generated from the back-scattering light waveform.

19. A measuring apparatus according to claim 18, wherein said detecting means detects an excess-loss generation portion of said optical fiber under testing.

20. A measuring apparatus as claimed in claim 18, wherein said measuring apparatus further comprises pump light source means for generating a pump light and a multiplexer for multiplexing said pump light and said optical pulse and launching multiplexed light into said optical fiber under testing, and wherein said detecting means detects a gain generation portion of said optical fiber under testing.

21. A measuring apparatus as claimed in claim 20, wherein said pump light source means includes two pump light sources for generating two kinds of light having polarization planes orthogonal to each other and having a same wavelength and same intensity, and wherein said measuring apparatus further comprises a polarization multiplexer for polarization multiplexing said two kinds of light.

22. A measuring apparatus as claimed in claim 20, wherein said pulse light source means includes two pulse light sources for generating two kinds of light pulses having polarization planes orthogonal to each other and having a same wavelength and same intensity, and wherein said measuring apparatus further comprises a polarization multiplexer for polarization multiplexing said two kinds of light pulses.

23. A measuring apparatus as claimed in claim 20, further comprising at least one of means for changing a polarization state of said pump light and means for changing a polarization state of said optical pulse.

24. A measuring apparatus as claimed in claim 20, further comprising means for generating a sequence of pulses as said pump light; and an optical fiber amplifier for amplifying said pulse sequence of said pump light.

25. A measuring apparatus as claimed in claim 24, further comprising means for making said pulse sequence of said pump light to be sequence of pulse bursts; and means for synchronizing said sequence of pulse bursts of the pump light with said optical pulses to launch said sequence of pulse bursts of said pump light and said optical pulses into said optical fiber under testing synchronously.

26. A measuring apparatus as claimed in claim 18, further comprising pump light source means for generating a pump light and a multiplexer for multiplexing said pump light and said optical pulse to launch multiplexed light into said optical fiber under testing, and wherein said receiving means for receiving the back-scattering light receives a wavelength converted light pulse having a wavelength substantially symmetric to a wavelength of said optical pulse with respect to a wavelength of said pump light as a symmetric axis on a wavelength spectrum, and wherein said detecting means detects a portion of said optical fiber under testing where the wavelength converted light pulse is generated.

27. A measuring apparatus as claimed in claim 26, wherein said pump light source means includes two pump light sources for generating two kinds of light having polarization planes orthogonal to each other and having a same wavelength and same intensity, and wherein said measuring apparatus further comprises a polarization multiplexer for polarization multiplexing said two kinds of light.

28. A measuring apparatus as claimed in claim 26, wherein said pulse light source means includes two pulse light sources for generating two kinds of light pulses having polarization planes orthogonal to each other and having a same wavelength and same intensity, and wherein said measuring apparatus further comprises a polarization multiplexer for polarization multiplexing said two kinds of light pulses.

29. A measuring apparatus as claimed in claim 26, further comprising at least one of means for changing a polarization state of said pump light and means for changing a polarization state of said optical pulse.

30. A measuring apparatus as claimed in claim 26, further comprising means for making said pump light to be a sequence of pulses; and an optical fiber amplifier for amplifying said pulse sequence of said pump light.

31. A measuring apparatus as claimed in claim 30, further comprising means for making said pulse sequence of said pump light to be sequence of pulse bursts; and means for synchronizing said sequence of pulse bursts of said pump light with said optical pulse to launch said sequence of pulse bursts of said pump light and said optical pulse into said optical fiber under testing sychronously.

* * * * *